US012585574B2

(12) United States Patent
Bach et al.

(10) Patent No.: US 12,585,574 B2
(45) Date of Patent: Mar. 24, 2026

(54) UNIT TESTING OF COMPONENTS OF DATAFLOW GRAPHS

(71) Applicant: Ab Initio Technology LLC, Lexington, MA (US)

(72) Inventors: Edward Alan Bach, Melrose, MA (US); Victor Abaya, Cambridge, MA (US); Matthew Eads, Lexington, MA (US); Carl Offner, Sudbury, MA (US); Matthew Zinno, Sharon, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 16/884,138

(22) Filed: May 27, 2020

(65) Prior Publication Data

US 2021/0191845 A1     Jun. 24, 2021

Related U.S. Application Data

(60) Provisional application No. 62/952,631, filed on Dec. 23, 2019.

(51) Int. Cl.
*G06F 9/44* (2018.01)
*G06F 11/3668* (2025.01)
(Continued)

(52) U.S. Cl.
CPC ...... *G06F 11/3688* (2013.01); *G06F 11/3698* (2025.01); *G06F 16/9024* (2019.01)

(58) Field of Classification Search
CPC ............. G06F 11/3688; G06F 16/9024; G06F 11/3664
See application file for complete search history.

(56) References Cited

U.S. PATENT DOCUMENTS 5,966,072 A     10/1999   Stanfill et al.
6,102,968 A      8/2000   Colby et al.
(Continued)

FOREIGN PATENT DOCUMENTS

CN          1936860        3/2007
CN        101443733        5/2009
(Continued)

OTHER PUBLICATIONS

ControlSoftwareSolutions.com [online], "Unit Testing in LabVIEW," Dec. 1, 2017, retrieved on Sep. 15, 2020, retrieved from URL<http://controlsoftwaresolutions.com/software-development-utf/>, 9 pages.
(Continued)

*Primary Examiner* — Hang Pan
(74) *Attorney, Agent, or Firm* — Fish & Richardson P.C.

(57) ABSTRACT

A data processing system defines a unit test for a dataflow graph comprising a plurality of executable components. The system receives an indication of a portion of a dataflow graph for testing. The system receives a parameter set indicating expected output data to be generated by execution of a component of the graph. The system receives input data for the component. The input data are indicated by the parameter set and configured to test a functionality of the component. The system defines a unit test of the component based on the parameter set. The unit test provides the input data to inputs of the dataflow graph, causes processing of the input data by the component of the dataflow graph to generate output data, and generates results data indicating a correspondence between the output data and the expected output data indicated by the parameter.

35 Claims, 15 Drawing Sheets

500

Receive an indication of a portion of a dataflow graph for testing
502

Receive a parameter set including a parameter indicative of expected output data
504

Receive input data indicated by the parameter set
506

Define a unit test of the at least one executable component based on the parameter set
508

(51) Int. Cl.
    *G06F 11/3698*     (2025.01)
    *G06F 16/901*     (2019.01)

(56)           References Cited

U.S. PATENT DOCUMENTS

| | | |
|---|---|---|
| 6,389,429 B1 | 5/2002 | Kane |
| 6,631,386 B1 | 10/2003 | Arun et al. |
| 6,983,317 B1 | 1/2006 | Bishop |
| 7,039,645 B1 | 5/2006 | Neal |
| 7,100,172 B2 | 8/2006 | Voellm et al. |
| 7,502,972 B1 | 3/2009 | Chilukuri et al. |
| 7,587,636 B2 | 9/2009 | Tillmann et al. |
| 7,716,630 B2 | 5/2010 | Wholey et al. |
| 8,484,159 B2 | 7/2013 | Stanfill et al. |
| 8,627,296 B1 | 1/2014 | Picard |
| 8,676,720 B1 | 3/2014 | Neal |
| 8,949,140 B2 | 2/2015 | Liu et al. |
| 9,052,908 B2 | 6/2015 | Fu et al. |
| 9,880,818 B2 | 1/2018 | Isman et al. |
| 10,055,333 B2 | 8/2018 | Offner et al. |
| 10,705,807 B2 | 7/2020 | Isman et al. |
| 10,929,122 B1 | 2/2021 | Goodwin et al. |
| 10,936,289 B2 | 3/2021 | Isman et al. |
| 11,347,484 B2 | 5/2022 | Isman et al. |
| 2002/0152241 A1 | 10/2002 | Hepworth |
| 2004/0153708 A1 | 8/2004 | Joshi |
| 2005/0097561 A1* | 5/2005 | Schumacher ............. G06F 8/10 |
| | | 712/213 |
| 2005/0257194 A1* | 11/2005 | Morrow .................... G06F 8/34 |
| | | 717/109 |
| 2006/0136784 A1* | 6/2006 | Prescott ............. G06F 11/0748 |
| | | 714/38.11 |
| 2007/0011668 A1 | 1/2007 | Wholey et al. |
| 2007/0118278 A1 | 5/2007 | Finn |
| 2007/0130188 A1* | 6/2007 | Moon ................... H04L 9/3236 |
| 2008/0126902 A1* | 5/2008 | Hickman ............ G06F 11/3684 |
| | | 714/E11.167 |
| 2008/0270350 A1 | 10/2008 | Bojanic et al. |
| 2009/0055445 A1 | 2/2009 | Liu et al. |
| 2009/0133033 A1 | 5/2009 | Lindo et al. |
| 2009/0265718 A1 | 10/2009 | Liu et al. |
| 2010/0023537 A1 | 1/2010 | Danan |
| 2010/0153928 A1 | 6/2010 | Livshits et al. |
| 2011/0145748 A1 | 6/2011 | Farver et al. |
| 2011/0184717 A1 | 7/2011 | Erickson |
| 2011/0271256 A1 | 11/2011 | Robertsson |
| 2011/0307897 A1 | 12/2011 | Atterbury |
| 2012/0131559 A1 | 5/2012 | Wu et al. |
| 2012/0166876 A1* | 6/2012 | Zambrana ........... G06F 11/3612 |
| | | 714/32 |
| 2012/0179726 A1 | 7/2012 | Roberts |
| 2012/0185767 A1 | 7/2012 | Schlegel |
| 2012/0254259 A1 | 10/2012 | McGuire et al. |
| 2012/0290527 A1* | 11/2012 | Yalamanchilli ....... G06F 16/283 |
| | | 707/602 |
| 2013/0055029 A1* | 2/2013 | Lawrance ........... G06F 11/3664 |
| | | 714/38.1 |
| 2014/0047418 A1 | 2/2014 | Bryan et al. |
| 2014/0141767 A1 | 5/2014 | Sharma |
| 2015/0169320 A1 | 6/2015 | Ahmed et al. |
| 2015/0169428 A1 | 6/2015 | Isman et al. |
| 2016/0012499 A1 | 1/2016 | Linevsky et al. |
| 2016/0124836 A1 | 5/2016 | Isman et al. |
| 2016/0124998 A1 | 5/2016 | Offner et al. |
| 2016/0321170 A1* | 11/2016 | Ellis .................... G06F 11/3692 |
| 2016/0350204 A1 | 12/2016 | Conlon et al. |
| 2017/0177740 A1 | 6/2017 | Abaya |
| 2017/0351494 A1 | 12/2017 | Isman et al. |
| 2018/0074944 A1* | 3/2018 | Hirt .................... G06F 11/3664 |
| 2018/0232214 A1 | 8/2018 | Isman et al. |
| 2018/0239615 A1* | 8/2018 | Ravid ................... G06F 9/4494 |

FOREIGN PATENT DOCUMENTS

| | | |
|---|---|---|
| CN | 102713864 | 10/2012 |
| CN | 102902529 | 1/2013 |
| CN | 102982065 | 3/2013 |
| CN | 103069385 | 4/2013 |
| CN | 103403677 | 11/2013 |
| CN | 109564507 | 4/2019 |
| JP | S62-006344 | 1/1987 |
| JP | S63-125088 | 5/1988 |
| JP | H02-294824 | 12/1990 |
| JP | H09-026897 | 1/1997 |
| JP | H10-083328 | 3/1998 |
| JP | 2005-228183 | 8/2005 |
| JP | 2005-301359 | 10/2005 |
| JP | 2005-302028 A | 10/2005 |
| JP | H06-222916 | 10/2005 |
| JP | 2006-004099 | 1/2006 |
| JP | 2006-500695 | 1/2006 |
| JP | 2009-509258 | 3/2009 |
| JP | 2010-511250 A | 4/2010 |
| JP | 2011-527052 A | 10/2011 |
| JP | 2011-222034 | 11/2011 |
| JP | 2013-171345 | 9/2013 |
| JP | 2015-115074 | 6/2015 |
| JP | 2016-115175 A | 6/2016 |
| JP | 2017-531855 A | 10/2017 |
| JP | 2018-500642 A | 1/2018 |
| KR | 10-2012-0104267 | 9/2012 |

OTHER PUBLICATIONS

Ni.com [online], "Prove It Works: Using the Unit Test Framework for Software Testing and Validation," Mar. 5, 2019, retrieved on Sep. 15, 2020, retrieved from URL<https://www.ni.com/en-us/innovations/white-papers/09/prove-it-works--using-the-unit-test-framework-for-software-testi.html>, 12 pages.

Ni.com [online], "Setup and Teardown VIs (Unit Test Framework Toolkit)," Jun. 2013, retrieved on Sep. 15, 2020, retrieved from URL<http://zone.ni.com/reference/en-XX/help/372584F-01/lvutfconcepts/utfc_set_tear/>, 3 pages.

Vogella.com [online], "Unit Testing with JUnit—Tutorial," Jun. 21, 2016, retrieved on Sep. 15, 2020, retrieved from URL<https://www.vogella.com/tutorials/JUnit/article.html>, 38 pages.

Office Action in Japanese Appln. No. 2018-563483, dated Feb. 7, 2022, 25 pages (with English translation).

Agarwal et al., Sinnet: Social Interaction Network Extractor from Text, Proceedings of IJCNLP, 2013, 33-36, 14-18.

CA Office Action in Canadian Application No. 2,966,533, dated May 6, 2021, 5 pages.

Cheung et al., "Partial replay of long-running applications", Proceedings of the 19th ACM Sigsoft Symposium and the 13th European Conference on Foundations of Software Engineering, SIGSOFT/FSE, 2011, 135-145.

Honarmand et al., "Reply Debugging: Leveraging Record and Replay for Program Debugging", ACM Sigarch Computer Architecture News, Architecture, 2014, 445-456.

IN Office Action in Indian Appln. No. 201827045633, dated Jun. 28, 2021, 7 pages.

JP Office Action in Japanese Appln. No. 2017-522000, dated Jun. 7, 2021, 38 pages (with English translation).

JP Office Action in Japanese Appln. No. 2017-522000, dated Oct. 29, 2019, 9 pages.

JP Office Action in Japanese Appln. No. 2018-563483, dated Jun. 15, 2021,8 pages (with English translation).

Office Action in CA Appln. No. 2,966,533, dated Oct. 21, 2021, 5 pages.

Office Action in CN Appln. No. 201580072406.3, dated Mar. 31, 2020, 23 pages (with English translation).

Office Action in CN Appln. No. 201580072406.3, dated Oct. 9, 2021, 13 pages (with English translation).

PCT International Preliminary Report on Patentability, PCT/US2015/059136,dated May 9, 2017, 11 pages.

(56)                    References Cited

OTHER PUBLICATIONS

PCT International Preliminary Report on Patentability, PCT/US2017/033285, mailed Dec. 13, 2018, 9 pages.
PCT International Search Report and Written Opinion in International Appln. No. PCT /US2020/065281, dated Apr. 12, 2021, 14 pages.
PCT International Search Report and Written Opinion issued in PCT/US2017/033285, mailed Jul. 26, 2017, 15 pages.
PCT International Search Report and Written Opinion, PCT/US2015/059136, mailed Feb. 15, 2016, 16 pages.
Office Action in Japanese Appln. No. 2018-563483, dated Oct. 7, 2022, 13 pages (with English translation).
Office Action in Japanese Appln. No. 2021-198695, dated Feb. 17, 2023, 11 pages (with English translation).
PCT International Preliminary Report on Patentability, PCT/US2020/065281, dated Jul. 7, 2022, 9 pages.
Office Action in Japanese Appln. No. 2018-563483, mailed on Nov. 22, 2023, 42 pages (with English translation).
Office Action in Chinese Appln. No. 2022107694075, mailed on Jul. 1, 2023, 17 pages (with Machine translation).
Office Action in Canadian Appln. No. 3,161,519, mailed on Dec. 5, 2023, 4 pages.
Office Action in Chinese Appln. No. 202210769407.5, mailed on Jan. 13, 2024, 20 pages (with Machine translation).

Office Action in European Appln. No. 20186842.9, mailed on Feb. 7, 2024, 11 pages.
Wikipedia.com [online], "Backup," Sep. 26, 2014, retrieved on Jan. 25, 2024, retrieved from URL<https://en.wikipedia.org/w/index.php?title=Backup&oldid-627148474>, 1-12 pages.
Office Action in European Appln. No. 20186842.9, mailed on Dec. 19, 2024, 26 pages.
Office Action in Japanese Appln. No. 2022-535176, mailed on Dec. 25, 2024, 13 pages (with English translation).
[No Author Listed], "Version Control of Test Cases in Test Management Tools," Test Management.com, May 2012, 6 pages.
Communication Pursuant to Article 94(3) EPC in European Appln. No. 20842396.2, mailed on Nov. 21, 2024, 8 pages.
Office Action in Argentinean Appln. No. 20200103656, mailed on Nov. 5, 2024, 6 pages (with Machine translation).
Oral Proceedings in European Appln. No. 20186842.9, mailed on Nov. 15, 2024, 8 pages.
Office Action in Mexican Appln. No. MX/A/2022/007818, mailed on Jul. 9, 2025, 8 pages (with English translation).
Office Action in Australian Appln. No. 2020412360, mailed on Feb. 20, 2026, 4 pages.
Office Action in Mexican Appln. No. MX/A/2022/007818, mailed on Dec. 19, 2025, 8 pages (with English translation).

* cited by examiner

| Probe | Data Source | Path |
|-------|-------------|------|
| A | Component 214 Out | C:\Testdata\data\record1.xls |
| B | Component 206 Out | https://sample.com/record2 |
| C | Component 208 Out | C:\Testdata\results.xls |

234

236    238    240

Records Different: 4

Records Added: 1

Records Deleted: 2

246

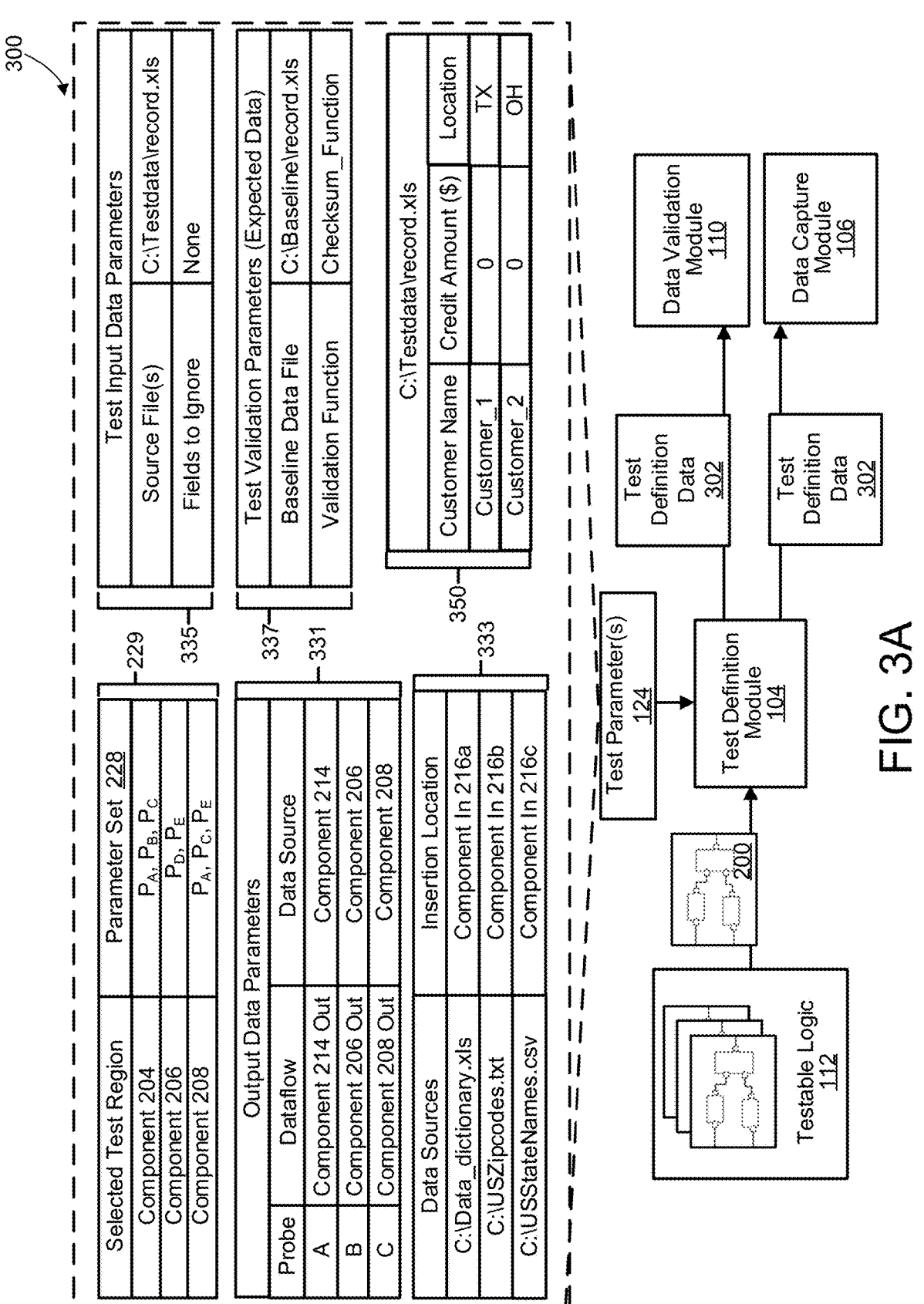

300

229

Selected Test Region

| Selected Test Region | Parameter Set 228 |
|---|---|
| Component 204 | $P_A$, $P_B$, $P_C$ |
| Component 206 | $P_D$, $P_E$ |
| Component 208 | $P_A$, $P_C$, $P_E$ |

Test Input Data Parameters

| Source File(s) | C:\Testdata\record.xls |
|---|---|
| Fields to Ignore | None |

335

337

331

Test Validation Parameters (Expected Data)

| Baseline Data File | C:\Baseline\record.xls |
|---|---|
| Validation Function | Checksum_Function |

Output Data Parameters

| Probe | Dataflow | Data Source |
|---|---|---|
| A | Component 214 Out | Component 214 |
| B | Component 206 Out | Component 206 |
| C | Component 208 Out | Component 208 |

| Data Sources | Insertion Location |
|---|---|
| C:\Data_dictionary.xls | Component In 216a |
| C:\USZipcodes.txt | Component In 216b |
| C:\USStateNames.csv | Component In 216c |

333

350

C:\Testdata\record.xls

| Customer Name | Credit Amount ($) | Location |
|---|---|---|
| Customer_1 | 0 | TX |
| Customer_2 | 0 | OH |

Test Parameter(s)
124

Testable Logic
112

200

Test Definition Module
104

Test Definition Data 302

Test Definition Data 302

Data Validation Module 110

Data Capture Module 106

Receive an indication of a portion of a dataflow graph for testing

502

Receive a parameter set including a parameter indicative of expected output data

504

Receive input data indicated by the parameter set

506

Define a unit test of the at least one executable component based on the parameter set

508

UNIT TESTING OF COMPONENTS OF DATAFLOW GRAPHS

CLAIM OF PRIORITY

This application claims priority under 35 U.S.C. § 119(e) to U.S. Provisional Patent Application Ser. No. 62/952,631, filed on Dec. 23, 2019, the entire contents of which are hereby incorporated by reference.

TECHNICAL FIELD

This document relates to testing executable code. More specifically, this document relates to unit testing of components of graph-based programs, the components representing executable code.

BACKGROUND

During development of data processing applications, developers can work outside of a production environment and may not have access to production data. To ensure that a data processing application will run correctly in production with actual data, realistic data can be used during development and testing of the data processing application.

SUMMARY

The data processing system described in this document is configured for testing of executable code of computer programs, such as dataflow graphs. More specifically, the data processing system is configured to configure a unit test of at least one executable component of the dataflow graph. A component of a dataflow graph includes executable code for executing at least one operation. The component operates on input data that are received by the component to generate output data by applying the at least one operation to the received input data. The data processing system is configured to, based on input from a user (e.g., a developer), isolate at least a portion of the dataflow graph, such as an executable component or plurality of components, and provide test input data as input data to the executable component or plurality of components to enable testing of just (i.e. only) that isolated portion of the dataflow graph. The test input data can replicate realistic input data for the component. The test input data are generally configured to invoke (test) one or more operations (e.g., each operation) that can be executed by the executable component to ensure that each invoked (tested) operation of the component is functioning as intended by the user. Output data are generated by the executable component(s) by executing the operations on the test input data. The output data can be analyzed by the data processing system to determine whether the component has operated as intended. For example, the output data of the component can be compared to expected output data that should be generated by the component in response to receiving the test input data if the component is functioning as intended. The results of the analysis of the output data by the data processing system can be stored as results data of the test. The data processing system can associate results data with a version of the dataflow graph including the component. The results data can include reports, test results, and so forth that indicate whether the test was passed, failed, and so forth. The results data can indicate how the component is operating and can provide information that indicates how and/or why the component failed, if applicable. The results data and/or structure data may also include data providing guidance for a user or a data processing system how to correct an error associated with the failed component, especially how to correct an error causing the failure of the component, to ensure proper future operation of the component. Modified input data, expected output data and/ or functionality of the relevant executable component may be received and the relevant executable component may be re-executed in accordance with this modification to generate output data, wherein this error may then not occur during the re-execution. This provides a guided human-machine interaction process which assists the user in performing a technical task of resolving errors occurring during testing of data processing. This allows to ensure proper execution of software applications and proper functioning of the underlying data processing system (even when performing the test outside the actual production environment).

The data processing system is configured for unit testing the functionality of at least portions of dataflow graphs that form an application. A unit test is configured to test the functionality of at least a portion of a dataflow graph independently from functionality of the remaining portions of the same or the other dataflow graphs of the application. Unit testing is configured to isolate the functional logic of the tested portions of the dataflow graphs. Isolating the functional logic of the tested portions of the dataflow graphs can ensure that all errors introduced by the tested logic can be identified and corrected. This helps a developer determine where errors are occurring in the dataflow graphs that form an application for remediation of those errors or other issues that are causing undesirable results.

The type of unit test being performed is referred to as a functional test because the functionality of the portions of dataflow graphs is being tested. The portions of the dataflow graphs include one or more executable components of the dataflow graphs. The data processing system configures a test for the dataflow graph based on a set of parameters. The parameters specify how the test is configured. The parameters specify input data and what data are expected to be output from the component. However, the parameters may also specify additional aspects of the configuration of the test. For example, the parameters may specify which components of the dataflow to test, locations of source data for inputs to the components, and so forth. A test is defined in a precise manner by setting the values of one or more of the parameters. The values of the parameters ensure that appropriate inputs are provided to the tested component and that desired functionality of the component is tested, and enable verification that the output data of the component is correct.

The data processing system is configured to facilitate testing only a portion of a computer program (such as an executable component or a plurality of components of a dataflow graph). For example, the input data for the component are replicated for a unit test. In general, the input data for the component may be configured such that it would invoke all or essentially all operations of the executable component when being received and processed by the executable component to generate output data. The input data may be configured in this manner based on profiling of the source data (production data normally to be used in the production environment) of an external data source, wherein the profiling includes analyzing the source data and obtaining statistical data about the source data, such as statistics of the values occurring in the source data. For example, one may want to test a subset of the operations of the component and the input data may be designed such that it invokes each operation of the subset of operations of the component. In some implementations, a component of a dataflow graph is configured to receive data from remote source(s) when the dataflow graph is executed, e.g., in a production environment. Rather than using the data from the remote resources, the above described input data is provided to the component to test the component. To test the component in a development environment, data from the remote source(s) are emulated (e.g., replicated in a realistic way as described above) so that the component is tested using realistic data, and thus the output data from the component represent realistic output data. The emulated input data can cause execution of all possible test cases for the component to ensure that each operation (e.g., each logical function, logic case, rule, etc.) of the component is invoked or triggered and a corresponding output generated. In some implementations, the emulated data covers a portion of the possible test cases for the component, such as to test a particular portion of the logical functionality of the component that is likely to have errors.

In some examples, the output data of a first component is provided as input data for a second component that is connected to the first component by a dataflow in the dataflow graph. By embodiments of the invention described, the data processing system is configured to overcome technical difficulties introduced by testing the entire dataflow graph or the entire application simultaneously, which can result in a very high number of possible test cases potentially slowing down the entire test and preventing those executable code, which is actually not relevant for the particular test, from executing and generating output data. In such cases, if a failure is detected when analyzing the output of the dataflow graph, it can be difficult to determine what portion of the dataflow graph caused the failure. The data processing system enables to precisely test portions of dataflow graphs as needed so that errors in the dataflow graphs are more easily identified and corrected.

Furthermore, when performing a test of a component, it can be determined that each possible input need not be tested. For example, it is possible that particular fields of input data for a given component are not used in the execution of the component. The test can be updated to train the test to focus on the important input data and operations of the component. In some implementations, a user (e.g., a developer) might wish to test a particular portion of a component repeatedly. The developer (or other user) might wish to focus a test on a small portion of the dataflow graph in between updates to that particular portion of the dataflow graph during debugging operations. It is useful for the developer to receive feedback in the form of testing while iterating through changes to the dataflow graph.

The implementations described herein can provide one or more of the following technical benefits. For instance, the techniques described herein enable to quickly configure a unit test of at least a portion of a dataflow graph in isolation, without requiring to configure other portions of the dataflow graph or other connected dataflow graphs. For example, it need not be ensured that upstream components are working as desired, that network resources (which may be referenced as data sources) are online, and so forth. For example, the location of input data for a component can be set to a data store including test input data, without altering the dataflow graph itself. The parameters of the set can be quickly updated to change which portion of the dataflow graph is being tested, what data are analyzed or validated, what baseline data are used for comparison, the value of validation functions, and so forth.

The unit testing of dataflow graphs by the data processing system has additional advantages. The unit test is integrated with a larger system. For example, the data processing system can integrate a plurality of unit tests together. The results of each unit test, performed on at least a portion of a dataflow graph or plurality of dataflow graphs, can be combined into a comprehensive report. The unit test is configured to interact with other portions of a system that are in production to emulate a production environment for the tested logic. The data processing system can schedule unit tests for different portions of the dataflow graphs. The results of each unit test are stored in a version control database along with the version of the dataflow graph(s) that are tested. If errors are discovered (e.g., in production, after an update, etc.), the data processing system can automatically revert the deployed logic to the most recent passing version, and sent an alert to a system administrator that a fault occurred. The results data and/or structured data may comprise data indicating that an error occurred (possibly also which kind or error occurred), the location within the tested logic where the error occurred (e.g. at which operation or graph component the error occurred) and guidance how to correct the error.

The unit testing of dataflow graphs can be used for most applications. For example, the data processing system can be used to build and/or audit graph-based software for any application. For example, the dataflow graphs being tested can be configured for management of data warehouses or data lakes, data processing logistics, web services execution, etc. The functions of each of these applications are testable. While a few applications are enumerated here, the list is not exhaustive. The unit testing therefore enables functional testing of portions of dataflow graphs that are integrated with a greater system, where the unit test itself can isolate the logic being tested. The data processing system enables repeatable tests that are immutable and can run at any time. The data processing system enables parameterized testing that allows the unit test to be configured for any system (e.g., client, server, etc.) and reconfigurable to other systems at any time. The unit test is thus portable and promotable. The data processing system enables automated, versioned unit tests with visible results that are (e.g. continuously) reported to the user to implement a guided human-machine interaction to ensure proper functioning of the underlying system.

In an aspect, a process implemented by a data processing system defines a unit test for a dataflow graph comprising a plurality of executable components. The process includes receiving an indication of a portion of a dataflow graph for testing, the portion including at least one executable component of the dataflow graph. The data processing system receives a parameter set including a parameter indicative of expected output data to be generated by execution of the at least one executable component. The data processing system receives input data for the at least one executable component. The input data is generally indicated by the parameter set and configured for testing a functionality of the at least one executable component. The data processing system defines a unit test of the at least one executable component based on the parameter set. The unit test is configured to provide the input data to one or more inputs of the dataflow graph. The unit test is configured to cause processing of the input data by the at least one executable component of the dataflow graph to generate output data. The unit test is configured to generate results data indicating a correspondence between the output data and the expected output data indicated by the parameter. The unit test is configured to cause generation of structured data indicative of an association between the results data, the input data, and the dataflow graph.

Embodiments can include any one or more of the following features.

In some implementations, the expected data comprise baseline data. Generating the results data includes comparing the output data to the baseline data. In some implementations, the baseline data comprise a plurality of data sets from different sources. In some implementations, the expected output data comprise an expected result of a validation function, and where generating the results data comprise applying the validation function to at least a portion of the output data to generate a result and comparing the result to the expected result.

In some implementations, including features of any of the preceding or subsequent implementations, the parameter set includes at least one additional parameter indicating one of: at least one position in the dataflow graph at which to extract the output data, a location of the expected output data, a location of baseline data for comparing to the output data, a value of a validation function for validation the output data.

In some implementations, the process includes receiving an indication of one or more portions of the input data to ignore during execution of the unit test and updating the parameter set based on the received indication.

In some implementations including features of any of the preceding or subsequent implementations, at least one of the executable components is configured to receive source data from a source external to the dataflow graph during execution, and where the input data includes values corresponding to the source data from the source external to the dataflow graph.

In some implementations including features of any of the preceding or subsequent implementations, the process includes retrieving a portion of a lookup file that provides input values to the at least one executable component for at least one function of the at least one executable component, where the lookup file provided by a remote source. The process includes storing the lookup file in a data storage that is accessible by the at least one executable component during execution of the at least one executable component.

In some implementations including features of any of the preceding or subsequent implementations, the process includes determining that a data source for the at least one executable component comprises a function call. For each function input of a set of function inputs of the function call, the process includes performing the function call to obtain a set of function outputs, each function output corresponding to a function input. The process includes storing the set of function outputs of the function call in a data storage that is accessible by the at least one executable component during execution of the at least one executable component.

In some implementations including features of any of the preceding or subsequent implementations, the process includes traversing the dataflow graph to discover at least one dataflow of the dataflow graph. The process includes inserting a probe on the at least one dataflow to indicate a location in the dataflow graph for extracting additional results data from execution of at least one executable component.

In some implementations, the process includes traversing the dataflow graph to discover a position in the dataflow graph at which to extract the output data generated by the execution of at least one executable component. The process includes inserting a probe at the position in the dataflow graph for extracting the output data.

In some implementations including features of any of the preceding or subsequent implementations, the process includes traversing the dataflow graph to discover a position in the dataflow graph at which to extract input data to the at least one executable component and inserting a probe at the position in the dataflow graph for extracting the input data.

In some implementations including features of any of the preceding or subsequent implementations, the process includes generating a hash of the structured data representing a version of the structured data and storing the hash of the version of the structured data in association with a corresponding version of the dataflow graph.

In some implementations including features of any of the preceding or subsequent implementations, the process includes generating a user interface that displays a representation of the dataflow graph. The user interface displays, for the at least one executable component, an annotation indicative of a status of the at least one executable component.

In some implementations including features of any of the preceding or subsequent implementations, the user interface comprises a representation of a status of at least one probe that is inserted into the dataflow graph. The user interface comprises an overlay layer showing one or more of the output data, the input data, and the results data associated with the dataflow graph in response to execution of the at least one executable component of the dataflow graph.

In some implementations including features of any of the preceding or subsequent implementations, the process includes generating a user interface that displays a representation of the dataflow graph, the user interface displaying a position in the representation of the dataflow graph in which the dataflow graph receives the input data.

In some implementations including features of any of the preceding or subsequent implementations, the results data comprise an indication that each function of the at least one executable component generated output data matching baseline data. In some implementations, the results data includes an indication that at least one function of the at least one executable component generated output data that did not match the expected output data. In some implementations, the results data include an indication that at least one function of the at least one executable component did not generate output data.

In an aspect, a data processing system defines a unit test for a dataflow graph comprising a plurality of executable components. The data processing system includes a data storage storing instructions and at least one processor configured to execute the instructions stored by the data storage to perform operations. The operations include receiving an indication of a portion of a dataflow graph for testing. The portion includes at least one executable component of the dataflow graph. The operations include receiving a parameter set including a parameter indicative of expected output data to be generated by execution of the at least one executable component; receiving input data for the at least one executable component. The input data are indicated by the parameter set and configured for testing a functionality of the at least one executable component. The operations include defining a unit test of the at least one executable component based on the parameter set. The unit test is configured to provide the input data to one or more inputs of the dataflow graph. The unit test is configured to cause processing of the input data by the at least one executable component of the dataflow graph to generate output data. The unit test is configured to generate results data indicating a correspondence between the output data and the expected output data indicated by the parameter. The unit test is configured to cause generation of structured data indicative of an association between the results data, the input data, and the dataflow graph.

Embodiments can include any one or more of the following features.

In some implementations including features of any of the preceding or subsequent implementations, the expected data comprise baseline data. Generating the results data includes comparing the output data to the baseline data. In some implementations, the baseline data comprise a plurality of data sets from different sources. In some implementations, the expected output data comprise an expected result of a validation function, and where generating the results data comprise applying the validation function to at least a portion of the output data to generate a result and comparing the result to the expected result.

In some implementations including features of any of the preceding or subsequent implementations, the parameter set includes at least one additional parameter indicating one of: at least one position in the dataflow graph at which to extract the output data, a location of the expected output data, a location of baseline data for comparing to the output data, a value of a validation function for validation the output data.

In some implementations including features of any of the preceding or subsequent implementations, the operations include receiving an indication of one or more portions of the input data to ignore during execution of the unit test and updating the parameter set based on the received indication.

In some implementations including features of any of the preceding or subsequent implementations, at least one of the executable components is configured to receive source data from a source external to the dataflow graph during execution, and where the input data includes values corresponding to the source data from the source external to the dataflow graph.

In some implementations including features of any of the preceding or subsequent implementations, the operations include retrieving a portion of a lookup file that provides input values to the at least one executable component for at least one function of the at least one executable component, where the lookup file provided by a remote source. The operations include storing the lookup file in a data storage that is accessible by the at least one executable component during execution of the at least one executable component.

In some implementations including features of any of the preceding or subsequent implementations, the operations include determining that a data source for the at least one executable component comprises a function call. For each function input of a set of function inputs of the function call, the operations include performing the function call to obtain a set of function outputs, each function output corresponding to a function input. The operations include storing the set of function outputs of the function call in a data storage that is accessible by the at least one executable component during execution of the at least one executable component.

In some implementations including features of any of the preceding or subsequent implementations, the operations include traversing the dataflow graph to discover at least one dataflow of the dataflow graph. The operations include inserting a probe on the at least one dataflow to indicate a location in the dataflow graph for extracting additional results data from execution of at least one executable component.

In some implementations including features of any of the preceding or subsequent implementations, the operations include traversing the dataflow graph to discover a position in the dataflow graph at which to extract the output data generated by the execution of at least one executable component. The operations include inserting a probe at the position in the dataflow graph for extracting the output data.

In some implementations including features of any of the preceding or subsequent implementations, the operations include traversing the dataflow graph to discover a position in the dataflow graph at which to extract input data to the at least one executable component and inserting a probe at the position in the dataflow graph for extracting the input data.

In some implementations including features of any of the preceding or subsequent implementations, the operations include generating a hash of the structured data representing a version of the structured data and storing the hash of the version of the structured data in association with a corresponding version of the dataflow graph.

In some implementations, the operations include generating a user interface that displays a representation of the dataflow graph. The user interface displays, for the at least one executable component, an annotation indicative of a status of the at least one executable component.

In some implementations including features of any of the preceding or subsequent implementations, the user interface comprises a representation of a status of at least one probe that is inserted into the dataflow graph. The user interface comprises an overlay layer showing one or more of output data, the input data, and the results data associated with the dataflow graph in response to execution of the at least one executable component of the dataflow graph.

In some implementations including features of any of the preceding or subsequent implementations, the operations include generating a user interface that displays a representation of the dataflow graph, the user interface displaying a position in the representation of the dataflow graph in which the dataflow graph receives the input data.

In some implementations including features of any of the preceding or subsequent implementations, the results data comprise an indication that each function of the at least one executable component generated output data matching baseline data. In some implementations, the results data includes an indication that at least one function of the at least one executable component generated output data that did not match the expected output data. In some implementations, the results data include an indication that at least one function of the at least one executable component did not generate output data.

In an aspect, one or more non-transitory computer readable media store instructions for defining a unit test for a dataflow graph including a plurality of executable components. Generally, the instructions configured to cause at least one processor to perform operations. The operations include receiving an indication of a portion of a dataflow graph for testing. The portion includes at least one executable component of the dataflow graph. The operations include receiving a parameter set including a parameter indicative of expected output data to be generated by execution of the at least one executable component; receiving input data for the at least one executable component. The input data are indicated by the parameter set and configured for testing a functionality of the least at one executable component. The operations include defining a unit test of the at least one executable component based on the parameter set. The unit test is configured to provide the input data to one or more inputs of the dataflow graph. The unit test is configured to cause processing of the input data by the at least one executable component of the dataflow graph to generate output data. The unit test is configured to generate results data indicating a correspondence between the output data and the expected output data indicated by the parameter. The unit test is configured to cause generation of structured data indicative of an association between the results data, the input data, and the dataflow graph.

Embodiments can include any one or more of the following features.

In some implementations including features of any of the preceding or subsequent implementations, the expected data comprise baseline data. Generating the results data includes comparing the output data to the baseline data. In some implementations, the baseline data comprise a plurality of data sets from different sources. In some implementations, the expected output data comprise an expected result of a validation function, and where generating the results data comprise applying the validation function to at least a portion of the output data to generate a result and comparing the result to the expected result.

In some implementations including features of any of the preceding or subsequent implementations, the parameter set includes at least one additional parameter indicating one of: at least one position in the dataflow graph at which to extract the output data, a location of the expected output data, a location of baseline data for comparing to the output data, a value of a validation function for validation the output data.

In some implementations including features of any of the preceding or subsequent implementations, the operations include receiving an indication of one or more portions of the input data to ignore during execution of the unit test and updating the parameter set based on the received indication.

In some implementations including features of any of the preceding or subsequent implementations, at least one of the executable components is configured to receive source data from a source external to the dataflow graph during execution, and where the input data includes values corresponding to the source data from the source external to the dataflow graph.

In some implementations including features of any of the preceding or subsequent implementations, the operations include retrieving a portion of a lookup file that provides input values to the at least one executable component for at least one function of the at least one executable component, where the lookup file provided by a remote source. The operations include storing the lookup file in a data storage that is accessible by the at least one executable component during execution of the at least one executable component.

In some implementations including features of any of the preceding or subsequent implementations, the operations include determining that a data source for the at least one executable component comprises a function call. For each function input of a set of function inputs of the function call, the operations include performing the function call to obtain a set of function outputs, each function output corresponding to a function input. The operations include storing the set of function outputs of the function call in a data storage that is accessible by the at least one executable component during execution of the at least one executable component.

In some implementations including features of any of the preceding or subsequent implementations, the operations include traversing the dataflow graph to discover at least one dataflow of the dataflow graph. The operations include inserting a probe on the at least one dataflow to indicate a location in the dataflow graph for extracting additional results data from execution of at least one executable component.

In some implementations including features of any of the preceding or subsequent implementations, the operations include traversing the dataflow graph to discover a position in the dataflow graph at which to extract the output data generated by the execution of at least one executable component. The operations include inserting a probe at the position in the dataflow graph for extracting the output data.

In some implementations including features of any of the preceding or subsequent implementations, the operations include traversing the dataflow graph to discover a position in the dataflow graph at which to extract input data to the at least one executable component and inserting a probe at the position in the dataflow graph for extracting the input data.

In some implementations including features of any of the preceding or subsequent implementations, the operations include generating a hash of the structured data representing a version of the structured data and storing the hash of the version of the structured data in association with a corresponding version of the dataflow graph.

In some implementations including features of any of the preceding or subsequent implementations, the operations include generating a user interface that displays a representation of the dataflow graph. The user interface displays, for the at least one executable component, an annotation indicative of a status of the at least one executable component.

In some implementations including features of any of the preceding or subsequent implementations, the user interface comprises a representation of a status of at least one probe that is inserted into the dataflow graph. The user interface comprises an overlay layer showing one or more of the output data, the input data, and the results data associated with the dataflow graph in response to execution of the at least one executable component of the dataflow graph.

In some implementations including features of any of the preceding or subsequent implementations, the operations include generating a user interface that displays a representation of the dataflow graph, the user interface displaying a position in the representation of the dataflow graph in which the dataflow graph receives the input data.

In some implementations including features of any of the preceding or subsequent implementations, the results data comprise an indication that each function of the at least one executable component generated output data matching baseline data. In some implementations, the results data includes an indication that at least one function of the at least one executable component generated output data that did not match the expected output data. In some implementations, the results data include an indication that at least one function of the at least one executable component did not generate output data.

In an aspect, computing system includes means for defining a unit test for a dataflow graph comprising a plurality of executable components. The computing system includes means for receiving an indication of a portion of a dataflow graph for testing. The portion includes at least one executable component of the dataflow graph. The computing system includes means for receiving a parameter set including a parameter indicative of expected output data to be generated by execution of the at least one executable component; receiving input data for the at least one executable component. The input data are indicated by the parameter set and configured for testing a functionality of the at least one executable component. The computing system includes means for defining a unit test of the at least one executable component based on the parameter set. The unit test is configured to provide the input data to one or more inputs of the dataflow graph. The unit test includes means for causing processing of the input data by the at least one executable component of the dataflow graph to generate output data. The unit test includes means for generating results data indicating a correspondence between the output data and the expected output data indicated by the parameter. The unit test includes means for causing generation of structured data indicative of an association between the results data, the input data, and the dataflow graph.

Embodiments can include any one or more of the following features.

In some implementations including features of any of the preceding or subsequent implementations, the expected data comprise baseline data. Generating the results data includes comparing the output data to the baseline data. In some implementations, the baseline data comprise a plurality of data sets from different sources. In some implementations, the expected output data comprise an expected result of a validation function, and where generating the results data comprise applying the validation function to at least a portion of the output data to generate a result and comparing the result to the expected result.

In some implementations including features of any of the preceding or subsequent implementations, the parameter set includes at least one additional parameter indicating one of: at least one position in the dataflow graph at which to extract the output data, a location of the expected output data, a location of baseline data for comparing to the output data, a value of a validation function for validation the output data.

In some implementations including features of any of the preceding or subsequent implementations, the computing system includes means for receiving an indication of one or more portions of the input data to ignore during execution of the unit test and updating the parameter set based on the received indication.

In some implementations including features of any of the preceding or subsequent implementations, at least one of the executable components is configured to receive source data from a source external to the dataflow graph during execution, and where the input data includes values corresponding to the source data from the source external to the dataflow graph.

In some implementations including features of any of the preceding or subsequent implementations, the computing system includes means for retrieving a portion of a lookup file that provides input values to the at least one executable component for at least one function of the at least one executable component, where the lookup file provided by a remote source. The computing system includes means for storing the lookup file in a data storage that is accessible by the at least one executable component during execution of the at least one executable component.

In some implementations including features of any of the preceding or subsequent implementations, the computing system includes means for determining that a data source for the at least one executable component comprises a function call. For each function input of a set of function inputs of the function call, the computing system includes means for performing the function call to obtain a set of function outputs, each function output corresponding to a function input. The computing system includes means for storing the set of function outputs of the function call in a data storage that is accessible by the at least one executable component during execution of the at least one executable component.

In some implementations including features of any of the preceding or subsequent implementations, the computing system includes means for traversing the dataflow graph to discover at least one dataflow of the dataflow graph. The computing system includes means for inserting a probe on the at least one dataflow to indicate a location in the dataflow graph for extracting additional results data from execution of at least one executable component.

In some implementations including features of any of the preceding or subsequent implementations, the computing system includes means for traversing the dataflow graph to discover a position in the dataflow graph at which to extract the output data generated by the execution of at least one executable component. The computing system includes means for inserting a probe at the position in the dataflow graph for extracting the output data.

In some implementations including features of any of the preceding or subsequent implementations, the computing system includes means for traversing the dataflow graph to discover a position in the dataflow graph at which to extract input data to the at least one executable component and inserting a probe at the position in the dataflow graph for extracting the input data.

In some implementations including features of any of the preceding or subsequent implementations, the computing system includes means for generating a hash of the structured data representing a version of the structured data and storing the hash of the version of the structured data in association with a corresponding version of the dataflow graph.

In some implementations including features of any of the preceding or subsequent implementations, the computing system includes means for generating a user interface that displays a representation of the dataflow graph. The user interface displays, for the at least one executable component, an annotation indicative of a status of the at least one executable component.

In some implementations including features of any of the preceding or subsequent implementations, the user interface comprises a representation of a status of at least one probe that is inserted into the dataflow graph. The user interface comprises an overlay layer showing one or more of the output data, the input data, and the results data associated with the dataflow graph in response to execution of the at least one executable component of the dataflow graph.

In some implementations including features of any of the preceding or subsequent implementations, the computing system includes means for generating a user interface that displays a representation of the dataflow graph, the user interface displaying a position in the representation of the dataflow graph in which the dataflow graph receives the input data.

In some implementations including features of any of the preceding or subsequent implementations, the results data comprise an indication that each function of the at least one executable component generated output data matching baseline data. In some implementations, the results data includes an indication that at least one function of the at least one executable component generated output data that did not match the expected output data. In some implementations, the results data include an indication that at least one function of the at least one executable component did not generate output data.

The details of one or more embodiments are set forth in the accompanying drawings and the description below. Other features and advantages will be apparent from the description and drawings, and from the claims.

BRIEF DESCRIPTION OF THE DRAWINGS

FIGS. 3A-3H show an example of a unit test.

DETAILED DESCRIPTION

Figure 1:
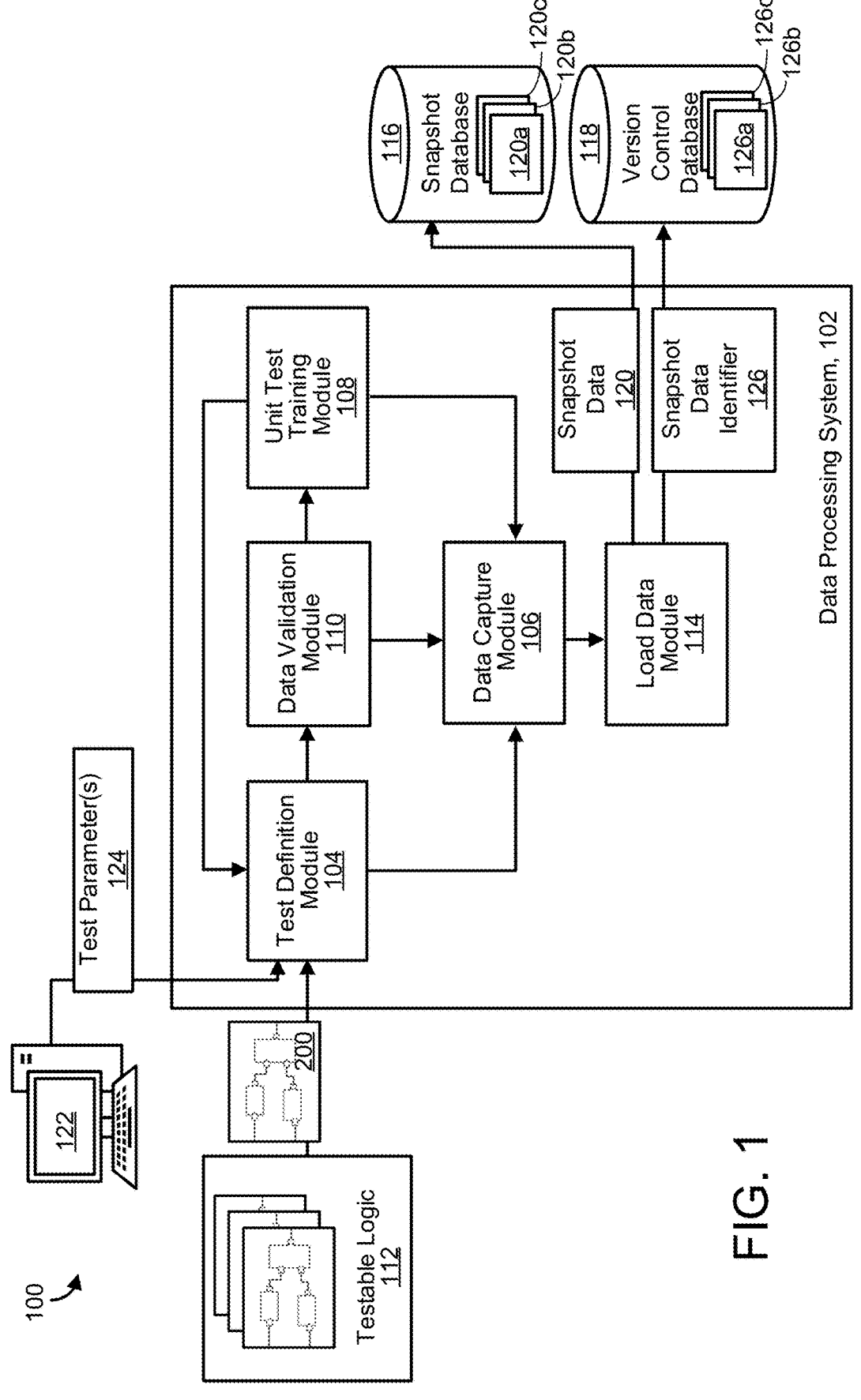
FIG. 1 is a block diagram of an example computing environment.

FIG. 1 shows an example computing environment 100 for configuring and execution of a unit test of executable logic of at least a portion of a computer program, such as an executable dataflow graph. The executable logic can form an application. A unit test is configured to test the functionality of the executable logic independently from functionality of the remaining portions of the executable logic of the application. Unit testing is configured to isolate the functional logic of the tested portions of dataflow graphs. Isolating the functional logic of the tested portions of an application, such as a dataflow graph, can ensure that errors introduced by the tested logic are identified and corrected without requiring testing of the entirety of the application. Unit testing can help a user determine where errors are occurring in the dataflow graphs that form an application.

The environment 100 includes a data processing system 102. The data processing system 102 can configure unit tests and/or execute unit tests for at least a portion of a dataflow graph. In some implementations, the data processing system 102 is a portion of a production environment or a portion of a development environment. A user (e.g., a developer) can configure dataflow graphs in the development environment, such as for eventual execution in the production environment. The data processing system 102 is used by the user to configure and execute tests for those dataflow graphs.

Generally, the data processing system 102 is configured for testing of executable logic (labeled as testable logic 112) included in executable dataflow graphs. An executable dataflow graph is a type of computer program that processes data using executable components (which in turn include or represent executable code that carries out data processing functions) included in the dataflow graph. The data processing system 102 is configured for testing a set of the executable components of a dataflow graph. A set of executable components can include a single component or a plurality of components. In this description, a dataflow graph is described as being configured to perform actions when the components of the dataflow graph are configured to perform those actions. The executable components (also called components) can include data sources to read or provide input data, data sinks to output or store data processed by the graph, and data processing components configured to process data, such as the input data or data generated by processing by another component, as subsequently described in reference to FIGS. 2A-2B.

Each unit test that is performed is represented in a snapshot database 116 as a test snapshot 120. A test snapshot 120 includes or represents data that are input into the unit test, output from the unit test, and data used for defining the unit test. For example, the test snapshot 120 includes test results data representing an outcome of a unit test. The test snapshot 120 includes test input data that are processed by the tested logic 112 (e.g., the tested portion of a dataflow graph) during the unit test. The test snapshot 120 includes data accessed from function calls or other data from remote sources. The test snapshot 120 includes data representing the dataflow graph logic of the tested logic 112. The test snapshot 120 includes output data which represent processed data output from the tested logic. The test snapshot 120 includes expected output data (e.g., baseline data or validation results data). The test snapshot 120 is stored in the snapshot database 116 in a way that relates a version of the test results data to a corresponding version of the input data used for that unit test, in addition to the test parameters, and data representing the tested logic of the unit test. For example, the test snapshot 120 can include input data, test results data from probes, validation data/baseline data, and the record formats for each of these data. These data are packaged into the test snapshot 120 (which can include a single file) and referenced by a pointer of a version control database 118. The data snapshot includes all data that are needed for the unit test to be executed. This enables the unit test to be executed on any system as a self-contained program. As subsequently described, data snapshots can be version controlled to that changes to a unit test can be reverted to an earlier version. For example, if changes to the unit test are not descried, an earlier version of the unit test can be recovered. In some implementations, the test snapshot 120 are called a data fingerprint of the unit test. The data of the test snapshot 120 are described in further detail below.

The test snapshot 120 can be linked to prior versions and subsequent versions of the unit test (e.g., other test snapshots). In this way, the test snapshot 120 represents structured data. A version controlled database 118 links each test snapshot 120a, 12b, 120c. For example, the identifiers 126a, 126b, and 126c can be linked to one another, and each can refer to an associated snapshot 120a, 120b, and 120c, respectively. The structure of the test snapshots is described more below.

Figure 2A:
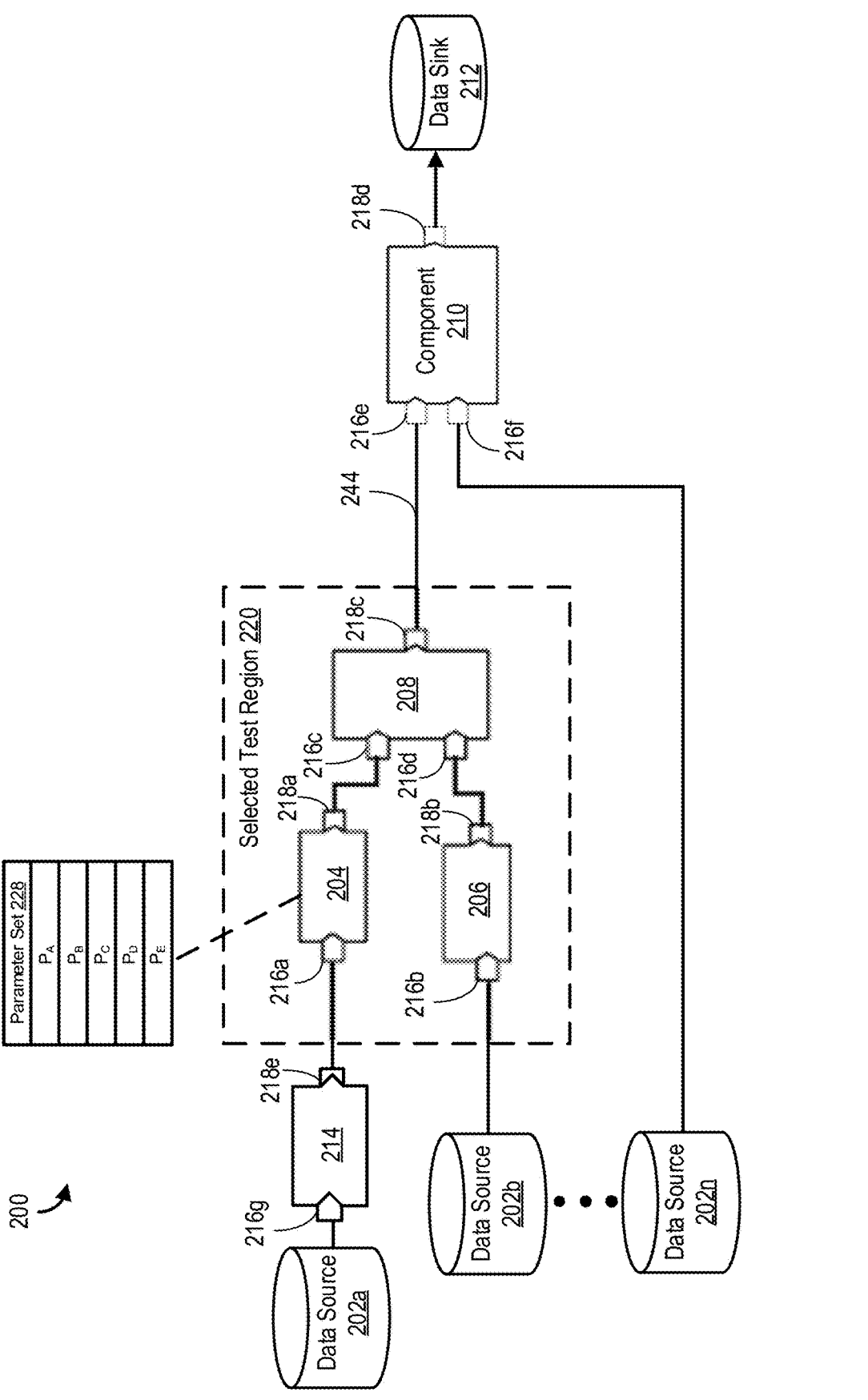
FIGS. 2A-2C show an example of testing a portion of a dataflow graph.
Figure 2B:
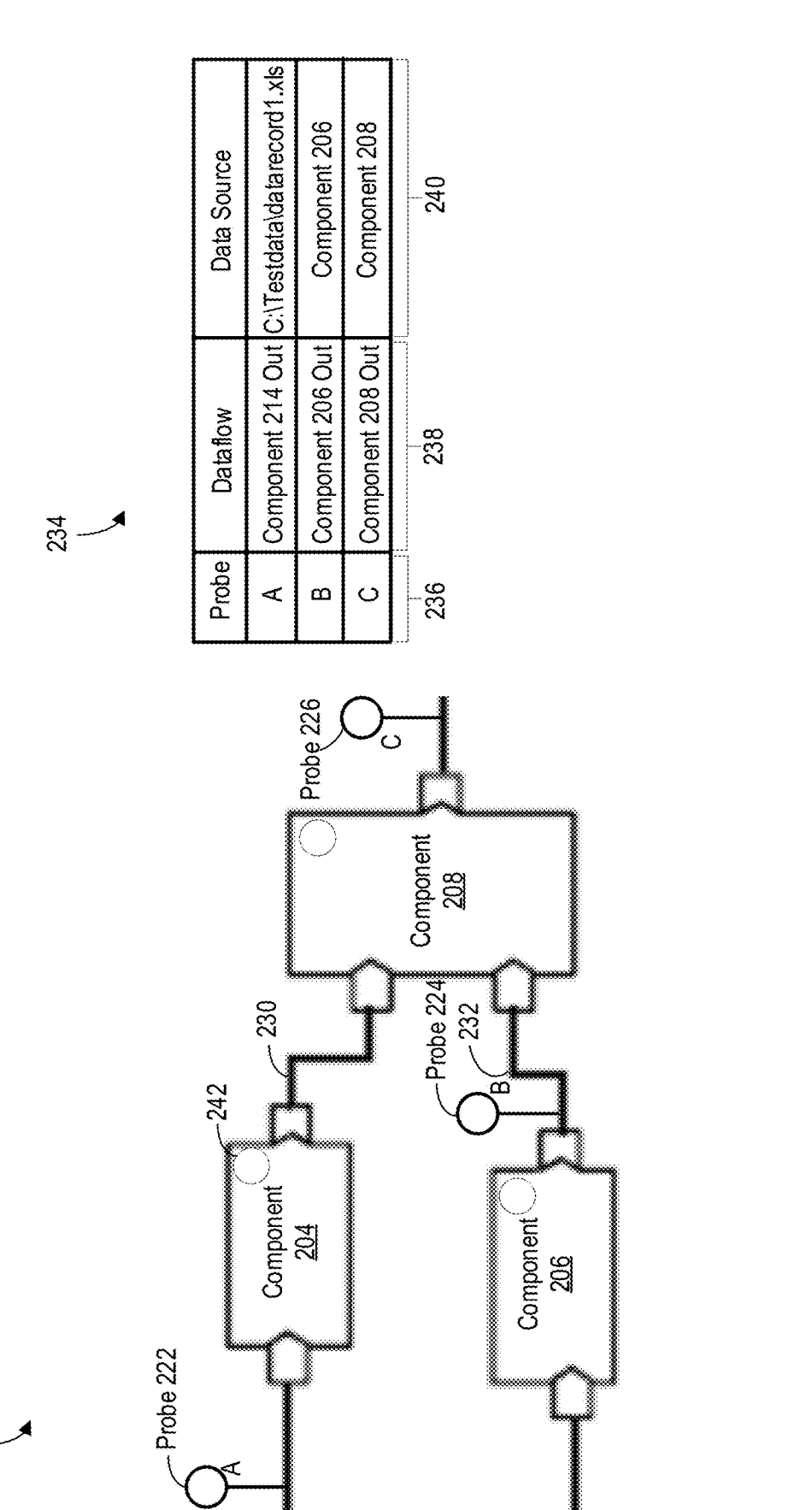

Briefly turning to FIGS. 2A-2B, generally, data from one or more data sources (such as data sources 202a-n) are manipulated and processed by components of a dataflow graph 200 and sent to one or more data sinks (such as data sink 212). Executable dataflow graphs, such as dataflow graph 200, are represented as directed graphs including nodes representing components, such as components 204, 206, 208, 210, and 214. The components 204, 206, 208, 210, and 214 are data processing components, each representing executable code for processing data from at least one data input or source and providing data to at least one data sink or output. The components 204, 206, 208, 210, and 214, data sources 202a-n, and data sink 212 are connected by directed links (such as link 244), sometimes referred to as data flows, representing flows of data between the components 204, 206, 208, 210, and 214, originating at the data sources 202a-n and terminating at the data sink(s) 212, each link 244 representing a flow of data. The data output ports 218a-e of upstream components are connected to the data input ports 216a-g of downstream components for communicating data across the dataflow links. Portions of the dataflow graph 200, such as a selected test region 220, can represent a portion that is reused, e.g., for different data sources and/or different data sinks. The data structures and program code used to implement dataflow graphs can support multiple different configurations by being parameterized, e.g., to enable data sources and/or data sinks to be substituted readily. A system for executing dataflow graphs is described in U.S. Pat. No. 5,966,072, titled "EXECUTING COMPUTATIONS EXPRESSED AS GRAPHS," incorporated herein by reference in its entirety.

An example of executing a graph is now described. After an initial graph is generated, a driver controls execution of the graph, and hence the processes depicted by the graph. When the driver executes a graph, it does so by performing the following general phases A-I. In phase A, as long as any one of the process vertices is in the enabled state, the driver repeats the following steps B-I. The driver may sometimes omit phases C, D, and I, and may intermingle the operations performed in steps B, C, E, and H. In phase B, the driver prepares the graph for execution. In this phase, the driver identifies runnable process vertices, chooses communication methods for links, and may generate adapter nodes. In phase C. The driver launches data links. In this phase, the driver creates certain computational structures required to implement communication methods. In phase D, the driver creates any other data structures or files required by the computational substrate. For the extended substrate described above, the driver creates a link file, as will be described. This permits programs to access graph connectivity information at run time. In phase E, the driver launches processes. In phase F, the driver waits for the processes to terminate. This phase completes when all processes have terminated successfully, or when any process terminates abnormally. In phase G, if any process terminates abnormally, execution of the graph is aborted. In phase H, otherwise, all process vertices in the runnable state transition to the done state. If no process vertices were in the runnable state, then cleanup phase I will be performed and control returned to the caller (the user of the driver, for example) with an indication that execution stalled. In phase I, the driver cleans up data links and the link file. This cleans up some of the data structures created in phases C and D.

The data processing system 102 is configured to enable a user (e.g., a developer) to isolate at least a portion of the dataflow graph 200, such as a set of one or more components of the dataflow graph, e.g., the components in the selected test region 220, and to provide test input data as input data to the set of components. The test input data, in some implementations, replicates realistic input data. The test input data are generally configured to test one or more operations (e.g., each operation) that are executed by each of the one or more components in the set to ensure that each tested operation of each component is functioning as intended by the user. Output data are generated by the component(s) by executing the operations on the test input data. The output data are analyzed by the data processing system 102 to determine whether the component has operated as intended. For example, the output data of the component are compared to expected output data that should be generated by the component in response to receiving the test input data if the component is functioning as intended. The results of the analysis of the output data by the data processing system are stored as results data of the test.

In some implementations, the input data can be generated by an application during the test. For example, an executable application can be included in the test definition. The application can be configured to execute during the test and feed input data into a dataflow that is an input to the components being tested. The application is included in the test data. The input data being generated by the application for processing by the components can be generated over time.

Returning to FIG. 1, the data processing system 102 includes a test definition module 104, a data capture module 106, a unit test training module 108, a data validation module 110, and a load data module 112. The data processing system 102 enables specification (e.g., by a user device 122) of the values of test parameters 124 for configuring the unit test. The data processing system 250 enables execution of the unit test.

Generally, the data processing system 102 enables iterative testing of at least a portion of the dataflow graph 200 in isolation. For example, the data processing system 102 enables iterative modification of the unit test. The data processing system 102 enables versions of the unit test to be stored as test snapshots 120, which can be referenced later for execution or for updating. A version of the test is stored with all parameter values, test data, component logic, and so forth. The test snapshot 120 can be executed on any system as a self-contained program (e.g., system calls and data references refer to data included in the test snapshot 120). When the unit test is changed, such as changing the test data or a parameter value, the updates can be saved in a new version of the unit test. Another updated test snapshot is generated with the changes. Each version of the test can be stored as a snapshot that are referenced by links in a version controlled storage. In some implementations, the differences of the test results between a first version of the unit test and a second version of the unit test can be shown explicitly (e.g., how the changes to the unit test from a prior version of the unit test affected the test results).

An overview of the process for configuring and/or executing a unit test is as follows. The data processing system 102 receives a computer program such as a graph (e.g., graph 200 of FIG. 2A) of the testable logic 112, or at least a portion 220 thereof. The test definition module 104 enables definition of test parameters 124 (e.g., through the user device 122) that specify the behavior of the unit test. When a unit test is executed, the data validation module 110 determines whether the test was passed, failed, or partly passed.

The unit test training module 108 enables iterative updating of the unit test, in response to the validation. For example, when changes are made to the unit test, the differences in the test results can be highlighted to the user. In response, a user can accept the changes and create a new test snapshot 120, or reject the changes and revert to an earlier version of the unit test.

The unit test training module 108 shows trend analysis, shows comparisons to a prior version of the unit test, enables a user to set the current results as the new baseline, and so forth. The data capture module 106 captures data relevant to the unit test that is used for executing the unit test. The data capture module 108 stores this data, such as the tests results data, test input data, test parameters 124, graph parameters, etc. as structured data (a test snapshot 120) for storing in the snapshot database 116. The data capture module 106 generates a pointer that points to the test snapshot 120 and stores the pointer in the version control database 118. The data capture module uses the load data module 114 for storing and retrieving data from the databases 116, 118.

Data for configuration or execution of a unit test of the testable logic 112 is stored in a snapshot database 116 as a portion of the test snapshot 120, which is accessible by the data processing system 102. This data for configuration of the unit test includes the test parameter values that define the unit test. As subsequently described, the different versions of the unit data for a unit test can be stored in the snapshot database 116, and referenced by a pointer stored in a version control database 118 for retrieval as needed for execution or configuration of the unit test.

The test snapshot 120 includes test input data for executing a unit test. The unit test training module 108 uses test input data to emulate input data from sources 202a-n for the components 204, 206, and 208 being tested. In some implementations, the snapshot database 116 can include other data for configuration or execution of the unit test. For example, if a component references a lookup table during processing of input data received from data sources 202a-n, the lookup table is stored in the reference database 116 so that the data are available for the unit test or configuration the unit test. In some implementations, only the entries that are actually referenced in the lookup table during the unit test are stored in the snapshot database 116 as a part of the test snapshot 120. For example, if three references are made to a lookup table during execution of the unit test, and two data entries of the lookup table are actually accessed, the data capture module 106 captures the two accessed entries and stores the data in the snapshot database 116 for access during a subsequent unit test. If the unit test is changed, other data from the lookup table can be captured and stored in the snapshot database 116. This ensures that the snapshot of the unit test includes as small a data footprint as possible to that all needed input data for the execution of the operations of the tested logic are available for the test, but that unprocessed data from the data sources 202a-n is not saved unnecessarily. Test input data, which the data processing system 102 stores in the snapshot database 116 and uses to test the testable logic 112, are subsequently described in further detail.

The testable logic 112 includes at least a portion of at least one dataflow graph 200, such as components 204, 206, and 208 of dataflow graph 200. The testable logic 112 can include a single component, a plurality of components, a whole dataflow graph, or multiple dataflow graphs, either in entirety or portions thereof. The components of the testable logic can be connected with data flows (links) or can be separate. If a plurality of dataflow graphs are included in the testable logic, the dataflow graphs can be connected to one another (e.g., an upstream graph and a downstream graph, a first graph being a sub-graph of a second graph, and so forth). In some implementations, the dataflow graphs can be separate from one another (e.g., not connected by data flows), but may be portions of a larger application. For example, the testable logic 112 can include two dataflow graphs that update a shared record. In some implementations, each portion of the testable logic received (e.g., each component, each dataflow graph, etc.) can be completely separate from other portions of the testable logic 112. For example, the testable logic 112 can include different versions of a dataflow graph that do not interact with one another during testing.

The testable logic 112 includes the executable logic of the component and any associated data (e.g., metadata) that the component uses for execution of the executable logic. For example, the testable logic 112 can include values for graph parameters that are associated with a component that is being tested. Graph parameters can specify a behavior of the component. Graph parameters are distinct from test parameters, which specify the behavior of the unit test. When configuring the unit test, the data processing system 102 can update values of graph parameters received in the testable logic 112 in addition to or alternatively to updating testing parameters. In some implementations, the graph parameters and test parameters can be updated through a user interface, as subsequently described.

When a unit test is being performed, the data processing system 102 selects a graph (such as graph 200) of the testable logic 112 for testing. In some implementations, the particular graph that is selected is specified in the test configuration as a test parameter. Generally, the unit test is performed on a graph 200 or a portion of the graph.

The data processing system 102 configures the unit test according to values of test parameters that are definable by a user and that specify the behavior of the unit test. The test parameters specify values for how unit test results are reported, how the unit test is scheduled and executed, how test unit results are versioned, and so forth.

A test parameter includes a setting or configuration for the unit test. The test definition module 104 of the data processing system 102 configures a unit test of the graph 200 that is received by the data processing system 102. The test definition module 104 can include a user interface, such as a test definition editor (TDE), which allows a user to update test parameters for configuring the test and to update graph parameters of the graph 200 that define the behavior of the graph. The user interface is subsequently described in relation to FIGS. 4-6.

The test definition module 104 enables definition of what logic of the testable logic is to be tested in the unit test and what test results are generated. The test definition module 104 selects input sources for the unit test, indicates which output data from component(s) are reported, and specifies what results data are generated.

For setting input sources, the test definition module 104 indicates one or more input source test parameters. The input source parameters specify which data source(s) are referenced by the tested component(s) for each of the inputs to a selected test region (e.g., region 220 of FIG. 2A) of a dataflow graph. The data source (e.g., sources 202a-n) can include an output of another dataflow graph, component (e.g., component 214), a lookup table, a dataset, and so forth. The input data from the input sources includes the test input data, which are the data being processed by the tested graph 200, and which are included as a part of the test snapshot 120. The input data from the input sources includes other data that is not part of the test input data, but that is used during the test by the tested graph 200. For example, input data that is not part of the test input data can include results of service calls, data dictionaries, and so forth, as further described below.

In some implementations, test input data are substituted for production data at one or more of the data sources specified by the input source parameters. The input source parameters can specify identify a database, file, or other data source including test input data as the source of data for the tested component(s). In some implementations, an additional value can be associated with the input source parameters for switching between test input data and production data (or a copy of production data).

The input source parameters for a data source can indicate further details as to which data are to be provided from the data source to the tested components. The input source parameters can specify a network address, a database address (e.g., a particular database record), a reference a table (e.g., a field, value, or both), a database key value, and so forth.

In some implementations, the input source parameters specify data to ignore from an input record. For example, if a record includes multiple fields, but only a subset of those fields are being tested, the input source parameters can specify that the fields not included in the subset of fields being tested can be ignored. Ignoring fields of data records can result in the data not being fetched over a network, reducing processing time and bandwidth costs. In some implementations, ignoring fields can specify that the outputs related to the ignored fields are not reported to the user or included in tests results data. In some implementations, ignoring one or more fields includes skipping processing of those fields in the unit test entirely, reducing a processing time of completing the unit test. In some implementations, the input values can be set to specific values using the test definition module 104, rather than referring to a test input data file or other data source. In some implementations, additional input data can be inserted into data flows in addition to source data being received from a data source.

In some implementations, the input source parameters can reference a location in the sources 202a-n that includes test input data that are used as input data for the components being tested by the unit test. The test input data can include particular fields, values, etc. in order to cover the entire functionality of the component(s) being tested. For example, if a component is configured to execute a case structure with a plurality of cases, the test input data can include input data for triggering each case of the case structure. In another example, the test input data can include predetermined ranges for values in order to test edge cases of functions. The test input data can be configured to test each branch of a decision tree represented in the logic of the component. Other similar examples, known in the art, for testing component functionality can be used. In some implementations, the test input data can include output data from the test results of a prior unit test. This can be done to show explicitly the changes the output(s) of the tested portions of the dataflow graph between iterations of the unit test.

In some implementations, the input source parameters include locations for memoized results of function calls that are performed in the testable logic. For example, if a tested component includes a function that references a lookup table, the test definition module 104 can be configured to retrieve the lookup results and store them in a new file (e.g., in the snapshot database 116), rather than retrieving the entire lookup table and storing the lookup table as test input data. Including the entire lookup table or file can drastically increase the size of test input data files and make versioning of the test (as described below) impractical. Thus, the test definition module 104 can be configured to retrieve a portion of a lookup file that provides input values to the tested component for at least one function of the component. Generally, the lookup file is provided by a remote source. The test definition module 104 then causes storing of the lookup file or portion thereof (e.g., by the data capture module 106) as a portion of the test snapshot 120 in the snapshot database 116. The stored data are retrieved and are accessible by the component during execution of the at least one executable component. This also reduces a runtime of the unit test, as the data need not be requested from the remote source. The unit test can thus be performed offline in isolation.

Similarly, the test parameters can specify locations of the results of function calls of remote source. This can be done for remote sources that include web services or other similar sources. The test definition module 104 can be configured to determine that a data source for the tested component specifies a function call. The test definition module 104, for each function input of a set of function inputs of the function call, can cause the service to perform the function call to obtain a set of function outputs, each function output corresponding to a function input. The set of function outputs of the function call are captured by the data capture module 106 and stored in the snapshot database 116 as a portion of the test snapshot 120. The function outputs are accessible by the tested component during execution of the tested component. This reduces a time needed for performing the function call and waiting for a response from a remote source during testing. This process also enables isolation of the test without requiring that the contents of the web service be stored with the unit test input data for performing the test offline. As stated above, reducing the size of the test input data can make versioning of the test practical.

The test definition module 104 indicates parameters for setting probes on data flows of the selected test region 220. A probe comprises a data object configured to indicate a location in a dataflow graph for extracting data. For example, a probe can be placed on dataflow. When data is sent along the dataflow with the probe, the data are read out by the probe. The data capture module 106 logs the data from the dataflows with probes and stores the data in the snapshot database 116 for subsequent use. Probes of dataflow graphs are described in further detail in U.S. Pat. No. 10,055,333, the contents of which are incorporated herein by reference in their entirety.

The probes (e.g., probes 222, 224, and 226 of FIG. 2B-2C) can be visually shown on the dataflow graph being tested. The probes indicate which data are to be reported in the test results. The probes can be inserted to cause the test results to include input data to the components being tested to show the unprocessed data being received from data sources 202a-n. The probes can cause the test results to include output data from the tested components. The output data includes data that has been processed by the tested components, such as during the unit test. Similar to the input source parameter, the test probes can be configured to ignore fields of the data flow they are probing. The data flow of the probe can be indicated graphically in the dataflow graph, as a network address, or both. Probe configuration can include setting of a key value of the data being reported by the probe. The data capture module 106 uses the key value for the comparison of the data of the probe to expected output data for reporting the results data of the unit test.

In some implementations, probes can be inserted automatically in the dataflow graph by the test definition module 104. For example, the test definition module 104 can be configured to traverse the dataflow graph to discover at least one dataflow of the dataflow graph. The test definition module 104 can then insert a probe on the at least one dataflow to indicate a location in the dataflow graph from which to extract additional results data from execution of the tested component. In some examples, the test definition module 104 can be configured to traverse the tested dataflow graph to discover a position in the dataflow graph at which to extract the output data generated by the execution of a tested component. The test definition module 104 inserts a probe at the position in the dataflow graph for extracting the output data. In some implementations, the test definition module 104 is configured to traverse the dataflow graph to discover a position in the dataflow graph at which to extract input data to a tested component and to insert a probe at that position to extract the input data.

The test parameters include a test scheduling parameter. The scheduling parameter specifies when the unit test is executed. For example, the unit test can be run on production software once a day, once a week, after an update is made, and so forth. The scheduling parameter enables automated testing a reporting of test results, including indication of a failed test (which in turn may indicate unexpected output data).

The test parameters specify what the target of the unit test is. In other words, the selected test region 220 can be represented as a test parameter. The target parameter specifies each of the components included in the test region 220 and how they are connected to one another. This can be done implicitly by referring to an executable file that includes the logic of the components, and the target parameter can indicate which portions of the executable logic are to be ignored. In this way, a user can precisely indicate which functions of the executable (e.g., which components) should be tested in the unit test.

The test parameters specify what data are included in the tests results data. Generally, the test results data includes structured data that relates output data including data processed by the tested portions of the dataflow graph to expected output data, such as baseline data. The test results data can include data that are generated after the unit test is executed. The generated data can include reporting data indicating whether the test was passed or failed and/or indicating which portions of the tested logic produced unexpected outputs. The test results data can include code coverage data indicating which expressions or operations of the tested logic were unexecuted (if any) during the unit test. The test results data can highlight changes in the output data from a prior unit test that is related to the current unit test (e.g., as specified by the user). For example, each of the test results for iterative unit tests of the same logic can be compared to show how the outputs changed from one iteration to the next. In some implementations, trend data can be generated to show how changes have occurred over multiple iterations. For example, if a particular output increases in value after each test while others decrease, this trend might be highlighted in the test results data, even though the output corresponds to expected values. The test results data can be shown in a user interface, described below. The test parameters can specify how test results data are presented, which outputs are ignored (if any), what code comparisons are performed, what expected data are used for comparison, and what metrics constituted a passed or failed test (e.g., whether every value need to perfectly match the expected outputs, what code coverage is desired, and so forth).

The test parameters can specify what the expected output of the tested logic should be from the execution of the logic on the test input data during the unit test. The expected output can include baseline data. Baseline data can include corresponding output data for each test input. When the unit test is executed, the generated output data can be compared to the baseline data. How closely the output data generated during the unit test matches the baseline data can be used by the data processing system 102 as a metric for whether the unit test was passed or failed. The expected output can include a validation function. The validation function can include logic for testing one or more outputs generated from the unit test. The validation function can validate an output being in compliance with one or more rules for the output data, without necessarily specifying an exact value that should be included for each output. For example, the rules can specify that the output be a numerical value within an acceptable range, be an acceptable format, include a particular value, be a particular value, have valid data included (e.g., not be an empty or null value), and so forth. For example, if the output is known to be a social security number (SSN), the validation function can confirm that the output includes a valid social security number that is associated with a user identifier (or test identifier). Many other similar validation functions are possible.

A data validation module 110 performs the validation of the test results data. The validation module 110 sends the validation results (which are included in the test results data) to the data capture module 106 for including in the snapshot database 116 with the snapshot of the unit test.

In some implementations, the test parameters can specify a destination of test results data. The destination includes a location for saving the test results, which can include a comparison of output data to expected data. In some implementations, the expected data can include baseline data, as described below. In some implementations, the output data of the test results data can be set as baseline data for a subsequent unit test.

In some implementations, the validation module 110 can include executable logic of one or more components for validation of the data. For example, the validation logic can be a sub-graph. The sub-graph can be configured to compare data from different portions of the graph being tested or perform any comparison of data for the test. For example, the validation module 110 can compare input data to output data, and ensure that the output data matches the result of a function of the input data.

As previously described, the test definition module 104 also enables modification of graph parameters. This can be useful if the user wishes to change the behavior of a component between unit tests. The parameter set of the dataflow graph can be received as metadata in the testable logic 112. The graph parameter set is shown in FIG. 2A as parameter set 228.

For a dataflow graph 200 of the testable logic 112, the test definition module 104 sets how many tests are to be performed on the dataflow graph. Typically, a single test is run, but the test definition module 104 can configure multiple unit tests to be run on a single dataflow graph or portion of a dataflow graph.

The test parameters can include parameters that indicate how the data capture module 106 (subsequently described) should capture the test input data and tests results data and whether the test should be versioned in a version control system.

The data processing system 102 can associate results data with a version of the dataflow graph including the component. The test results data can include reports, test results, and so forth that indicate whether the test was passed, failed, and so forth. The results data can indicate how the component is operating and can provide information that indicates how the component failed, if applicable.

The data capture module 106 is configured to capture the test snapshot 120 for each unit test in response to the unit test being executed. For example, if a unit test is executed for a portion of a dataflow graph, the unit test is updated, and a subsequent unit test is performed, the test snapshot 120 for each execution of the unit test can be related in a snapshot database 116. The snapshot database 116 can be a version control system. The test snapshot 120 can be stored as structured data in which each version of the test snapshot 120 for a unit test are related to each other. The test snapshot 120 can be stored as a compressed file (e.g., a .tar file). The snapshots 120a, 120b, and 120c, for example, can be linked to one another in a sequence, each being a subsequent version of the previous snapshot file. The links of the structured data can be managed in a version control database 118. For example, the identifiers 126a, 126b, and 126c can be linked to one another, and each can refer to an associated snapshot 120a, 120b, and 120c, respectively. This enables a user to determine how updates to the unit test or to the dataflow graph changed the test results.

Once a unit test is executed, the data capture module 106 saves the input data that was used, any data retrieved from remote sources (e.g., function calls to web services, etc.), the test input data (if applicable), output data, the test results data, and the version of the dataflow graph that was tested in the test snapshot 120. The test snapshot 120 represents the unit test. As stated previously, what data are included in the output data, input data, etc. is determined based on the values of parameters, such as probes.

The data capture module 106 is configured to generate the snapshot data that represents a version of the unit test. The unit test and versioning information that relates the test snapshot 120 to other test snapshot 120s stored in the version control database 118. The version control database 118 stores a pointer that references the test snapshot for a unit test. When a particular version of the unit test is to be executed, the pointer which points to the corresponding test snapshot 120 of the snapshot database 116 is referenced. The data processing system 102 retrieves the corresponding test snapshot 120 from the snapshot database. As stated previously, the unit test can be executed using the data of the test snapshot 120 representing that unit test.

In some implementations, storing the test snapshots 120 as version controlled objects can be difficult due to size limitations. As stated previously, memoizing some of the function calls or lookup tables can mitigate this issue, as well as capturing only the data that is used during execution by the graph 200 as input data. The data capture module 106 generates a hash (or other such pointer value) for each test snapshot 120. The hash value can represent a version of the test snapshot 120. The data capture module 106 can store the hash of the version of the test snapshot 120 in the version control database 118. When the hash value is referenced, the corresponding test snapshot 120 can be retrieved.

The data capture module 106 is configured to track the behavior of the dataflow graph during the unit test and save data about the execution of the components of the dataflow graph. For example, if a function call is performed, or a value in a lookup table is referenced, the data capture module 106 is configured to store the referenced values. The data stored by the data capture module 106 can be used to update future iterations of the unit test (e.g., perform "memoizing" operations as described previously).

The data capture module 106 can be used to manage data of the snapshot database. For example, the data capture module 106 can be sued to check in versions of the snapshot data into the snapshot database 116. The data capture module 106 can be used to promote versions of the dataflow graph to production. The capture of data by the data capture module 106 is generally autonomous and can be specified by the parameters of the test definition module 104.

The unit test training module 108 is configured to update the unit test in response to receiving data from the data capture module 106 about a previous unit test that is performed. The unit test training module 108 is configured to receive the test snapshot 120 from the data capture module 106 and update the unit test by updating parameters. This process can be autonomous, semi-autonomous, or manual. For example, memoizing service calls can be performed automatically by the unit test training module 108. The updated parameter values can be sent to the test definition module 104 for updating configuration of the unit test for a subsequent execution of the unit test.

In some implementations, the unit test training module 108 is configured to generate data related to a sequence of unit tests (e.g., of a particular dataflow graph or dataflow graphs). For trend analysis, previously described, can be performed by the unit test training module 108 to update test parameter values. For example, upon execution of a unit test, the results data produced by the data validation module 110 may indicate that the unit test was failed by the tested components. However, a developer may view the results data and determine that the current functionality of the tested logic is actually desirable and should correspond to a passed unit test. The developer, through the unit test training module 108, can update the unit test baseline so that the current unit test configuration represents a passed test with the logic that is being tested. This can be for a number of reasons, but can include causing the unit test to ignore an additional field in the test input data, because different baseline data or validation functions to be used, or make some other change to the unit test to cause the test to pass, as subsequently described. The unit test training module 108 thus allows comparison of the test results between iterations of the unit test so that the developer can compare the changes and determine whether the unit test should be restored to an earlier version or whether the unit test as currently defined represents a successful test.

The test training module 108 can show which test results changed from a previous version of the unit test in a suggestions summary output. The summaries output is configured to show the user how changes to the unit test have resulted in changed test results of the test. In some implementations, the test training module 108 suggests whether to accept or reject the changes to the test. In some implementations, the test training module 108 suggests how the unit test can be modified to result in a satisfactory result (e.g., change a failed unit test to a passed unit test). The summaries output can show data indicating whether a dataflow passed data (e.g., whether a component was executed at all). The summaries output can show data indicating dataflow coverage to confirm whether the component processed records, how many records were processed of the test data, and did the flows pass the processed records as expected. The summaries can show data indicating what statements of the components actually executed (e.g., code coverage) for each component. The summaries can check that the number of records on each dataflow is the expected number, or that data exists (or does not exist) on the dataflow generally as expected. For example, the summaries indicate whether records are being "silently" rejected by not being passed on dataflows as expected.

In some implementations, the unit test training module 108 is configured to make suggestions to a user as to what changes can be made to the test (e.g., to cause a failed test to become a passed test). The suggestions can include whether the current test results data should be regarded as the new baseline data for future validation by the data validation module 110, what fields should be ignored, and so forth. For example, a specific field can be causing the test to be considered failed, though that specific field is unimportant to the test. The test training module 108 can highlight that the specific field has data that does not pass the test, while other fields have data that are passing the test. The test training module 108 can suggest that the specific field be ignored, so that the failed test becomes a passed test. A user, presented with this suggestion, can review the field and determine that the field is indeed not relevant to this test, and confirm that the field be ignored in subsequent tests. For example, the user can select a control in a prompt, suggesting that the field be ignored.

The summaries output can list fields of the test data and show how each field either passed or failed the unit test. For example, the summaries output can show differences in the test results from a prior version of the unit test. The summaries output can show which probes were associated with a failure in the unit test. The summaries output can show what fields were added, changed, or removed from prior unit tests. The test training module 108 can suggest to the user what the differences from prior test results imply. For example, if every record shows a modification in the test results from prior test results, there may be a fundamental change to the unit test can is causing the failure. The user may be prompted to revert a change made to the unit test. In another example, if only a few records are changed, the test training module 108 can highlight which test results were changed to fail the unit test that had previously passed the prior version of the unit test. In this case, the user may want to redefine the current test as a passed test. A prompt can be shown to a user to accept the current test as a passed test (e.g., update the baseline of the test).

In some implementations, the test definition module 104 provides guidance to executing the unit test. For example, if a user attempts to execute a unit test, but no data have been captured yet by the data capture module 106, an error message can be presented to the user indicating that not all test parameters have been defined yet.

The summaries output of the test training module 108 can also provide validation and verification prompts to guide the user. For example, the test training module 108 can show the results of a negative test. Here, the test training module 108 can verify that a test fails at the expected assertion or error point in the code. In other words, the test training module 108 is confirming that the test is "failing correctly" or that the test is failed in the manner expected. Another validation that can be performed is a rejection of a test. The test training module 108 can be configured to verify that a number of rejected records is either zero or otherwise in an expected range. The test training module 108 can prompt the user when the number is outside the range that is expected (e.g., if a non-zero result is expected and the result is zero). The rejected records can be shown to the user. The test training module 108 can be configured to filter tests. For example, the test training module 108 checks that a number of records on a flow matching a specified expression is zero. If any value matches the specified expression (e.g., falls outside a range, has a null value, etc.) then those records can be highlighted to the user. As stated previously, the test training module 108 can be configured to suggest a subset of the output data to ignore or consider. For example, a prompt can be generated to the user to filter records to ignore when comparing against a baseline of expected data.

The load data module 114 is configured to load data into the snapshot database 116. Generally, the load data module 114 receives snapshot data from the data capture module 106 and loads the snapshot data into the snapshot database 116. The load data module can also receive data from the unit test training module 108 for loading into the snapshot database 116. For example, the load data module 114 can receive updated parameter values from the unit test training module 108. In some implementations, the load data module can receive trend data from the unit test training module 108.

Returning to FIG. 2A, generally, the flow of the dataflow graph may be altered by the use of parameters, such that a component or a series of components are bypassed. In general, a parameter represents a value related to a dataflow graph that can be configured or changed to alter the behavior of the dataflow graph. For example, a property can be changed between uses of the dataflow graph, and the dataflow graph may perform operations differently because of the change. One or more of components 204, 206, 208, and 210, sources 202a-n, and sinks 212 can each be associated with one or more parameters, which can be referred to as a parameter set. An example parameter set 228 is associated with component 204 and includes parameters $P_A$, $P_B$, $P_C$, $P_D$, and $P_E$. Examples of how these parameters can be used to configure the dataflow graph and/or testing of the dataflow graph are subsequently described. The parameters and their values define the behavior of the dataflow graph. For example, a parameter can define the location of the data source or data sink on a physical disk. A parameter can also define the behavior of a component, such as how a sorting component sorts the data input into the component. In some examples, values for the parameters in a parameter set are populated at run time of the dataflow graph.

In some examples, the value of one parameter can depend on the value of another parameter. For instance, a data source may be stored in a file in a particular directory. The parameter set for the data source can include a first parameter called "DIRECTORY" and a second parameter called "FILENAME." In this example, the FILENAME parameter depends on the DIRECTORY parameter (e.g., DIRECTORY may be "/usr/local/" and FILENAME may be "input.dat"). Parameters may also depend upon the parameters for other components. For example, the physical location of a data sink for a dataflow graph may depend upon the physical location of the data source for the dataflow graph. For instance, a data sink can include a set of parameters which includes a FILENAME parameter which depends upon the DIRECTORY parameter of the data source (e.g., the FILENAME parameter for the data sink may be "/usr/local/output.dat" where the value "/usr/local/" is obtained from the DIRECTORY parameter for the data source).

The component 204 can be a graph interface component that references one or more other dataflow graphs, sometimes referred to as subgraphs (not shown). At run time, the dataflow graph 200 dynamically loads and executes the subgraph(s) referenced by the component 204, e.g., enabling the dataflow graph 204 to flexibly access various functionalities provided by the subgraphs. One or more parameters $P_A$, $P_B$, $P_C$, $P_D$, and $P_E$ of the component 204 define the specific subgraph(s) referenced by the component 204. Each subgraph is also associated with a parameter set including one or more parameters, each of which defines the behavior of the corresponding subgraph.

While written to also achieve specific business ends, the underlying structure and construction of the graph is determined based upon technical considerations. For example, dataflow graph components 204, 206, 208, and 210 may be selected to maximize reusability, or to support parallel processing. On the other hand, where a graph is used may be largely a business decision. Some of the parameters associated with a parameterized dataflow graph can be used to enable business users to customize dataflow graphs without requiring the user to understand the technical complexities behind its implementation. The parameterized dataflow graphs simplify customization and facilitate reuse.

An interface for identification of parameter values for constructing a dataflow graph can be presented on a client machine. In some implementations, the client may be accessing a development environment running on a server using a web browser on the client that provides the parameter interface, and using a scripting language which provides some capability for client side processing. The scripting language may communicate with the server to update parameters and perform other necessary operations. This communication may occur via a bridge machine which translates the communications between the client and the server running a development environment storing objects and associated parameter values for the graphs being constructed. The interface allows a user to configure the parameters of a parameterized dataflow graph even if the user lacks technical knowledge relating to dataflow graphs and dataflow graph configuration.

A configuration interface, presented on a client device (not shown), enables a user to access a graph configuration module. Through the configuration interface, the user can specify characteristics of the data sources 202a-n, the data sink 212, and the logic to be performed by the dataflow graph, without needing technical knowledge about dataflow graph configuration. Based on the characteristics specified by the user, parameter values can be assigned for the parameter set 228 thus defining the behavior of the dataflow graph according to the characteristics specified by the user.

Within the configuration interface, the parameters of the parameter set 228 for each component can be combined and reorganized into groups for interacting with a user, e.g., reflecting business considerations rather than technical considerations. The configuration interface for receiving values for the parameters based on user input can display different parameters according to relationships among parameters in a flexible way that is not necessarily restricted by aspects of the development environment on the server. An example of a configuration interface is described in U.S. Publication No. 2011/0145748, the contents of which are incorporated herein by reference in their entirety.

A dataflow graph can be configured at compile time, by altering the dataflow graph pre-compilation to perform a particular action, or at run-time, by setting parameters or altering configuration files that are used by the dataflow graph. An environment for developing and configuring dataflow graphs is described in more detail in U.S. Pat. No. 7,716,630, titled "Managing Parameters for Graph-Based Applications," incorporated herein by reference in its entirety.

As stated previously, the dataflow graph 200 includes a test region 220. The test region 220 specifies which components of the dataflow graph 200 are being tested in the unit test. The test region is specified by a test parameter. The test region 220 is shown as a graphical dashed line, but can be represented as a list of components. In some implementations, the test region 220 includes components from a plurality of different graphs, and those components may function independently of one another. While a single test region 220 is shown, the graph 200 can include multiple, disconnected test regions.

The test region 220 defines the unit test in regard to what input data are needed for the test and what outputs are generated by the test. For example, in region 220 of FIG. 2A, inputs 216a and 216b are inputs for the unit test because data flows connected to these inputs are connected to sources outside of the test region 220. While the data sources 202a and 202b corresponding to inputs 216a and 216b are shown as databases, data sources can also include other dataflow graphs or components that are not being tested.

In dataflow graph 200, components 204, 206, and 208 are being tested, while component 210 is not tested. The output 218a of component 204 and output 218b of component 206 are data sources for inputs 216c and 216d of component 208. Output 218c of component 218 includes the latest output data of the unit test defined by region 220. Inputs 216e and 216f of component 210, as well as output 218d of component 210, are not consequential to the present unit test.

The unit test isolates components 204, 206, and 208 for testing. To isolate these components, input data from sources 202a and 202b can be simulated using test input data or provided from the sources themselves. Data form data source 202n are not consequential to the unit test defined by region 220 and does not need to be simulated or retrieved to execute the unit test.

As stated previously, component 204 is associated with metadata including parameter set 228. While each of the components 204, 206, 208, and 210, data sources 202a-n, and data sink 212 are generally each associated with a parameter set, only parameter set 228 is shown for clarity. Generally, when viewing a representation of the graph, the parameters 228 are not visible (and are thus bordered by dotted lines).

Turning to FIG. 2B, once the region 220 of the unit test is defined, the other test parameter values can be set as described previously. For example, probes 222 and 224 can be placed (either manually or automatically) on input data flows to the test region 220. Similarly, a probe 226 can be placed on an output data flow. Probes can be placed on intermediate data flows 230 and 232 for intermediate output data to be included in the test results data.

Generally, for each probe 222, 224, and 226, the unit test generates corresponding expected data that can be compared to the data at the probe to determine whether the unit test was passed or failed. Generally, input data at probes 222 and 224, which includes test input data or other input data, are identical to the expected data because no processing has occurred. However, a comparison can be performed to ensure that no data is missing or corrupted for the test input data. Generally, for each probe on a data flow that includes output data, such as probe 226, expected data are retrieved for the unit test for validation, as previously described.

Figure 2C:
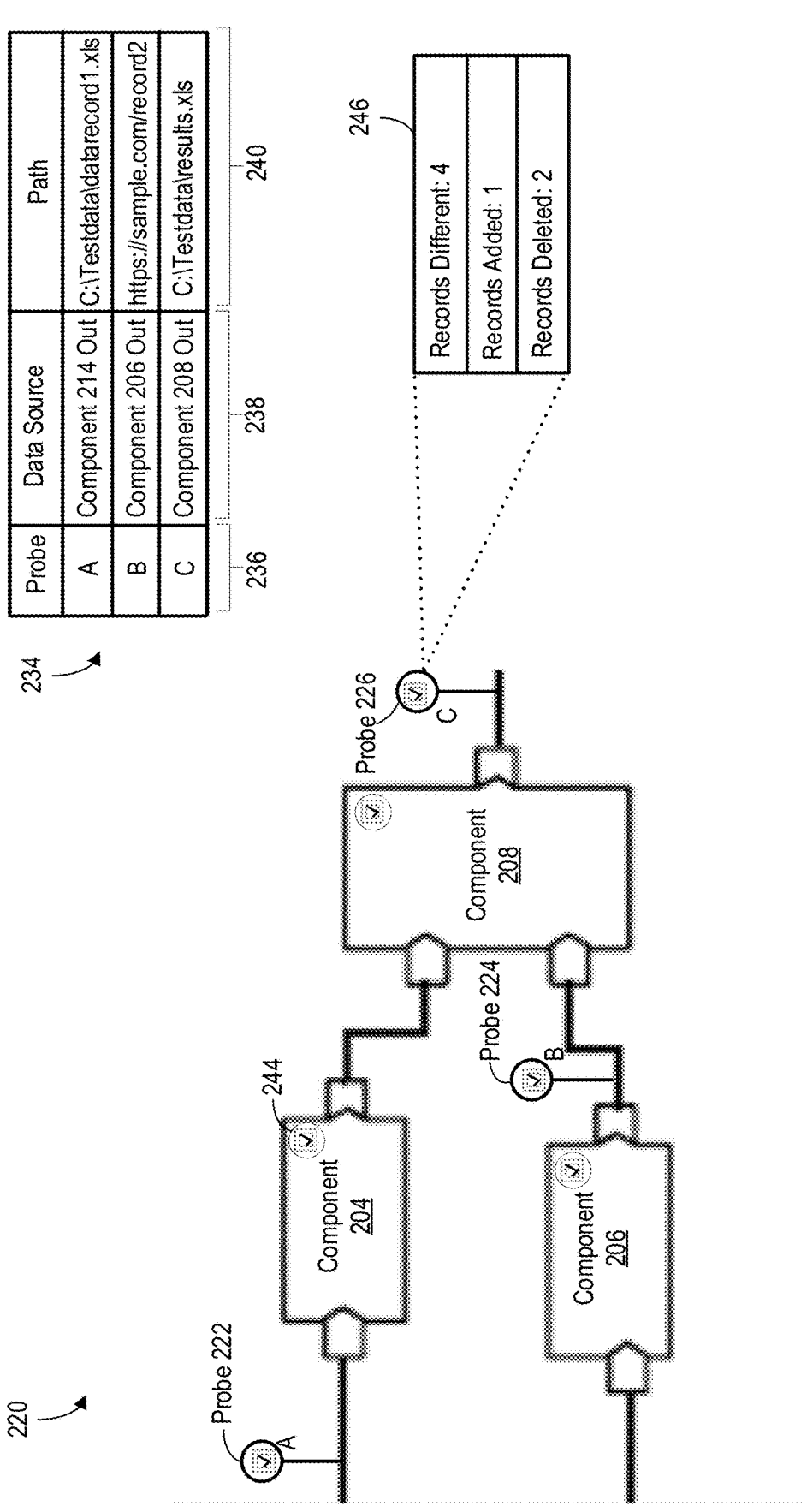

Data that are recorded for each of the probes during the unit test can be shown in a user interface. In some implementations, a table 234 can show the locations of the stored data for each probe. Here, table 234 include a field 236 listing the probes, a field 238 listing the data source, and a field 240 listing each location that the data recorded at the probes 222, 224, and 226 are stored. Each component and probe is shown with a status overlay 242 in the graph or in a graphical representation of the graph. The status overlay 242 shows whether the component has executed in the test. As shown in FIG. 2C, when a corresponding probe has received data, or the component 204 has executed, a status overlay 244 updates to show execution has occurred.

Figure 4:
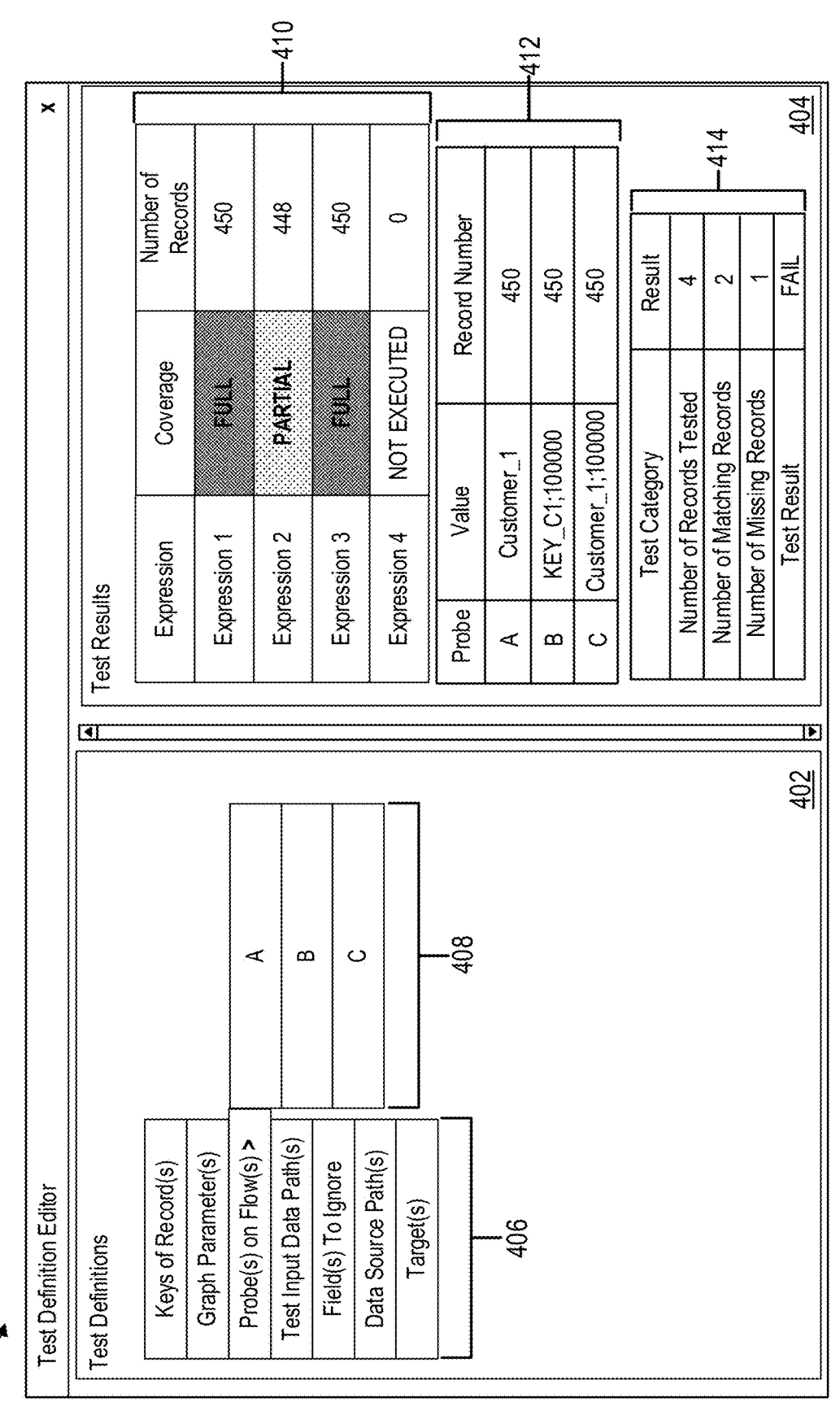
FIG. 4 shows an example of a user interface.

Each of the probes 222, 224, and 226 can be selected in a user interface to show comparisons for the dataflow on which the probe is placed. For example, selection of a probe can show how many records are different, how many records are added, and how many records are deleted. An example pop-up interface 246 is shown for probe 226. Selection of a probe 226 can also enable the user to update the test parameters for configuring the test, as shown in FIG. 4.

Figure 3B:
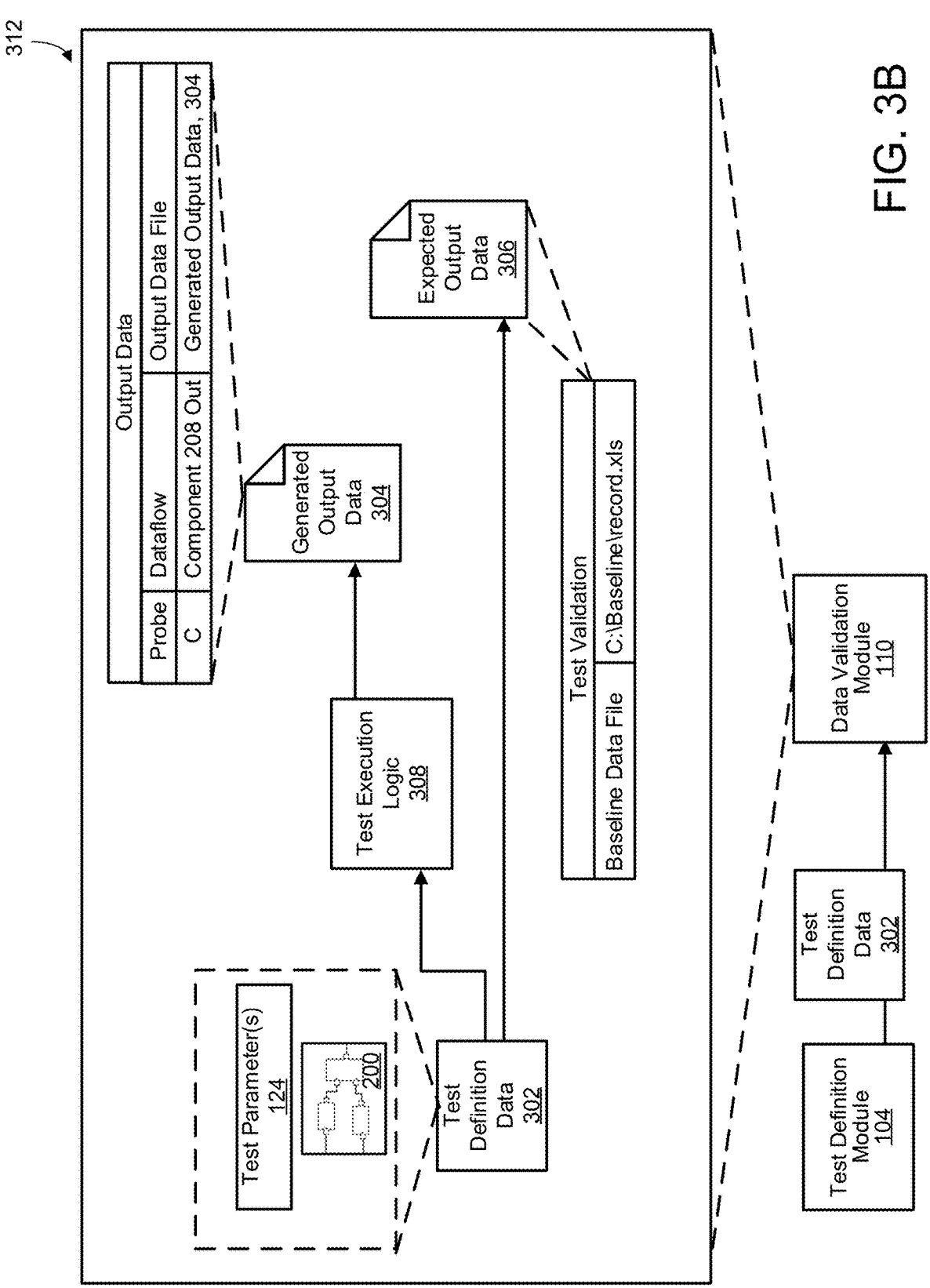
Figure 3C:
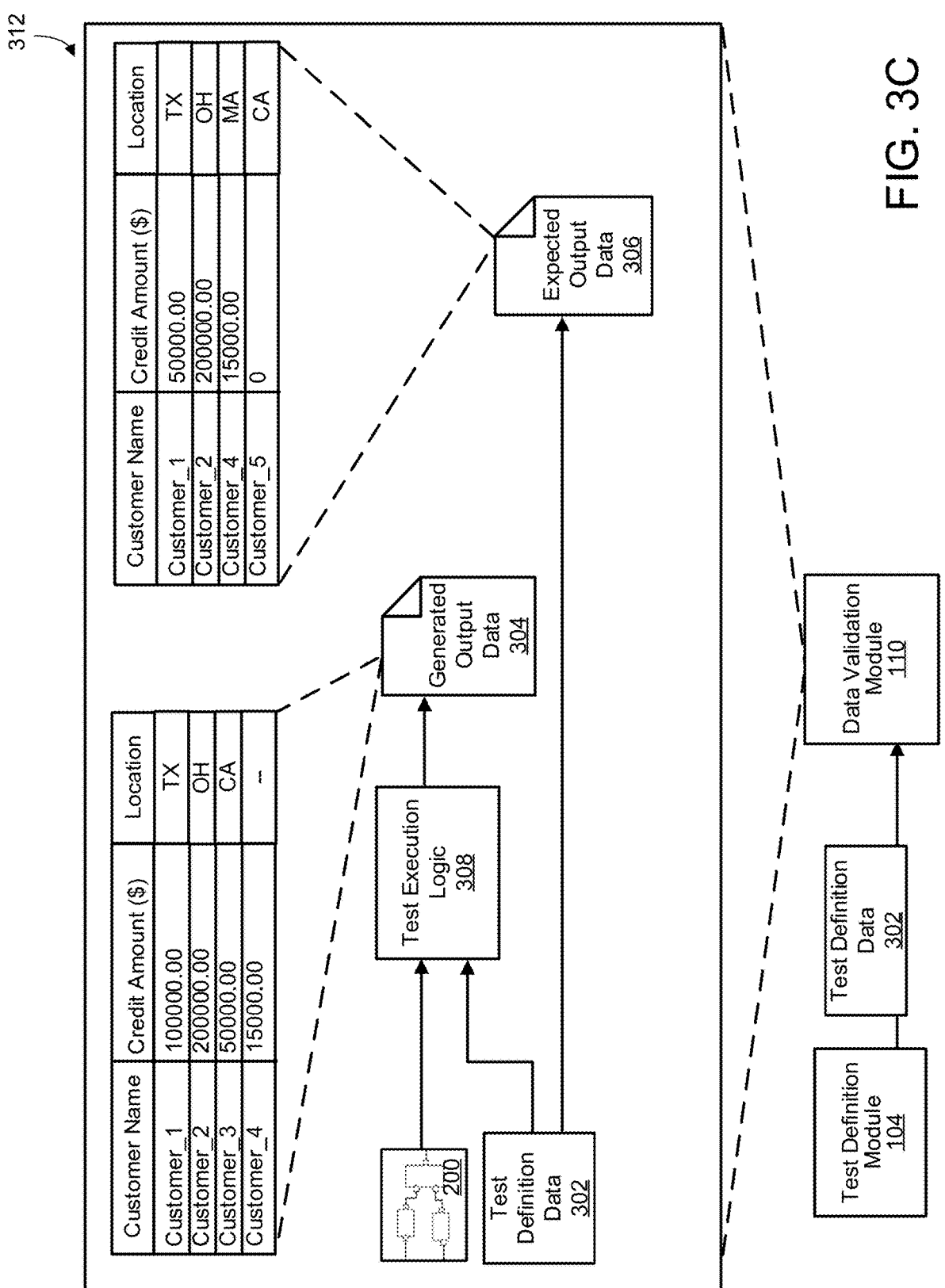

Turning to FIGS. 3A-3H, an example of a validation 300 of the unit test by the data capture module 106 is shown. In FIG. 3A, the test definition module 104 receives data representing a data flow graph 200 from a source of the testable logic 112. The test definition module 104 receives test parameters 124, such as through user input on a user device 122 or from a data store. As previously described, the test definition module generates, from the test parameters 124, test definition data 302 that defines the behavior of the unit test. The test definition data 302 are sent to the data validation module 110 and the data capture module 106.

As shown in FIG. 3A, the test parameters 124 include the parameter set 228 including the graph parameters 228, the test data 350, output data parameters 331, data source locations 333, and insertion locations for the dataflow graph 200. These data define what portions 229 of the dataflow graph 200 are being tested, what test data are being used by test data parameters 335, how the dataflow graph 200 should execute, what data are available to the tested components of the dataflow graph during testing, and what output data are logged. These test parameters also define what output data the data processing system 102 expects for a successful test, what validation parameters 337 are being used for test validation (e.g., what baseline data should be or what validation functions should be used, and so forth). These data are previously described in detail with respect to FIG. 1.

Turning to FIG. 3B, the data validation module 110 receives the test definition data 302 from the test definition module 104 for validating the test as successful, unsuccessful, or partially successful. The data validation module 110 can operate the test execution logic 308, or the test execution logic 308 can be operated by another system and the generated output 304 can be sent to the data validation module from that other system.

Figure 3D:
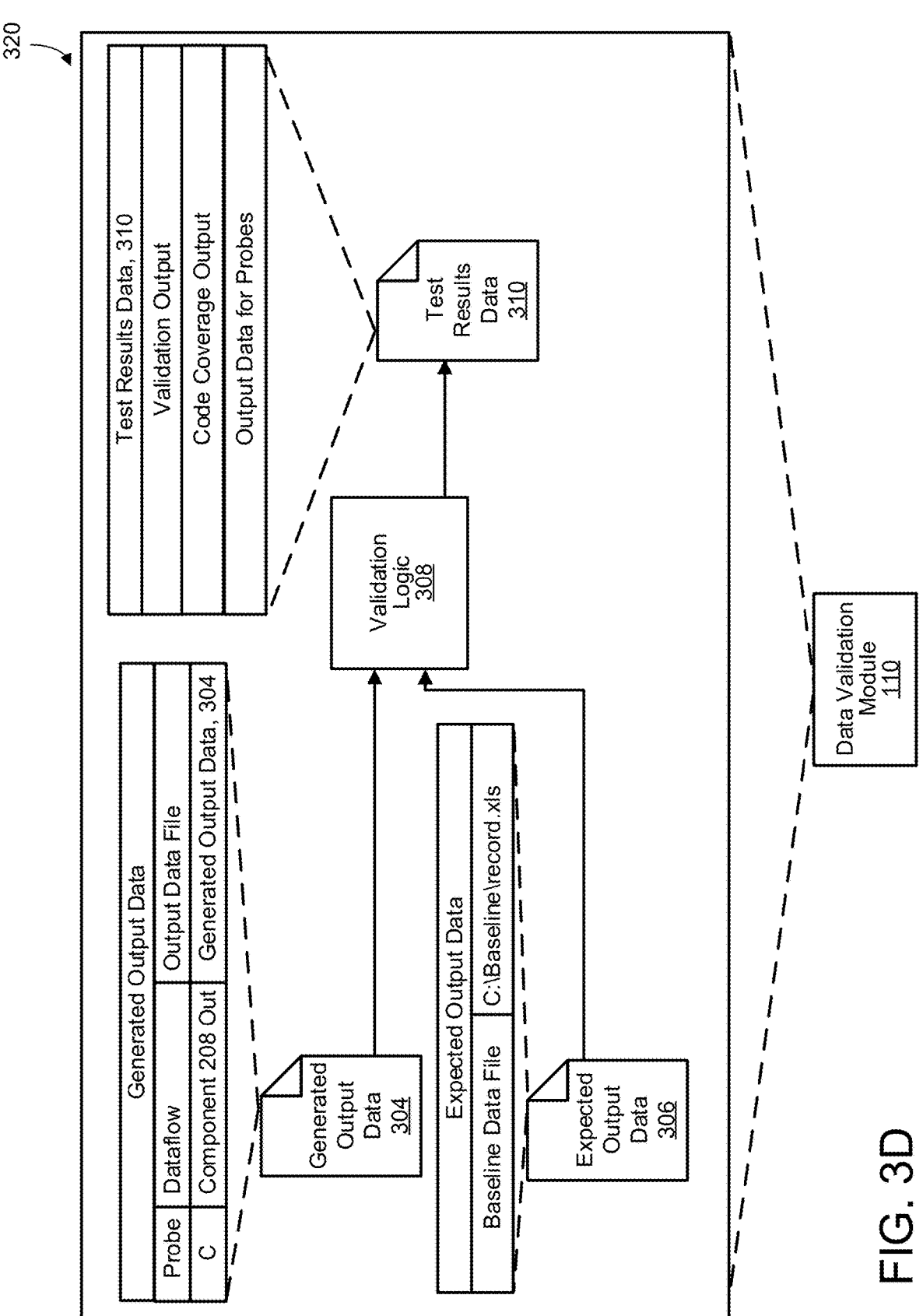

Turning to FIG. 3D, a process 320 is shown for validation of the unit test. The data validation module 110 receives the test definition data 302, which includes the expected output data 306. The expected output data 306, as previously described, can include actual expected output values for the dataflow graph 200, validation functions that check whether the output values satisfy given metrics (e.g., is the format correct, does the value fall within an expected range, are multiple outputs consistent with one another, and so forth), or a combination of both. The data validation module 110, using validation logic 308, compares the generated output data 304 to the expected output data 306 and determines whether the test has been passed, failed, or partially passed, as reported in test results data 310. Passing a test does not necessarily require the generated output data 304 to match the expected output data 306. In some implementations, the test can be defined as "passed" if certain portions of the generated output data 304 match the expected output data 306 or satisfy validation functions of the expected output data (or both).

Figure 3E:
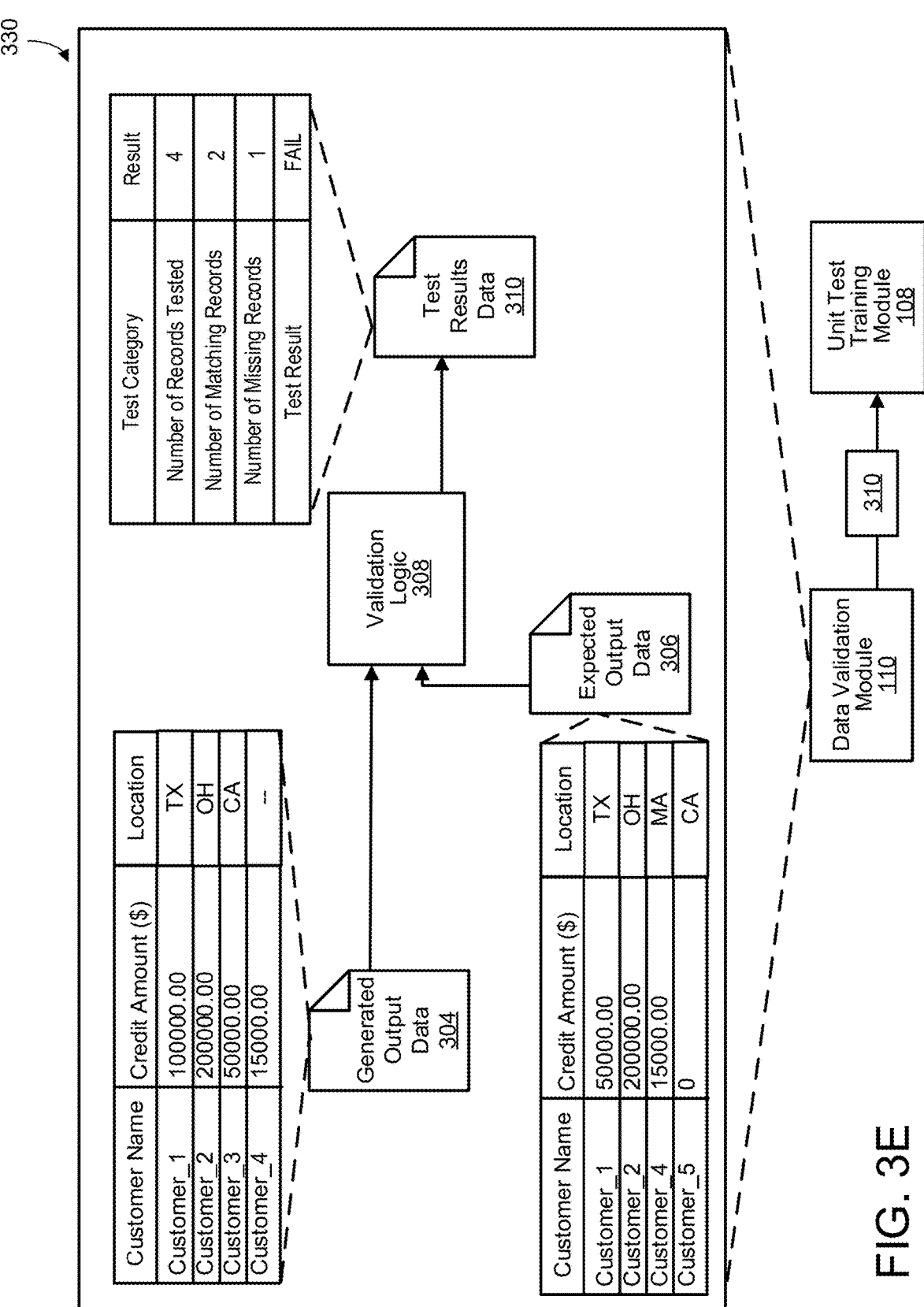

Turning to FIG. 3E, the process 330 shows example values for the generated output data 304, the expected output data 306, and the test results data 310. The generated output data 304 includes customer names, credit amounts for the customers, and example locations. The expected output data 306 includes the same fields. As shown in the test results data 310, four records are being tested, two records are matching the expected output to the generated output. A record is missing from the generated output. As a result of these mismatches, the test result is a fail. However, the user could indicate that this actually good enough to represent a pass, and update the test to expect the current generated output, as subsequently described.

Figure 3F:
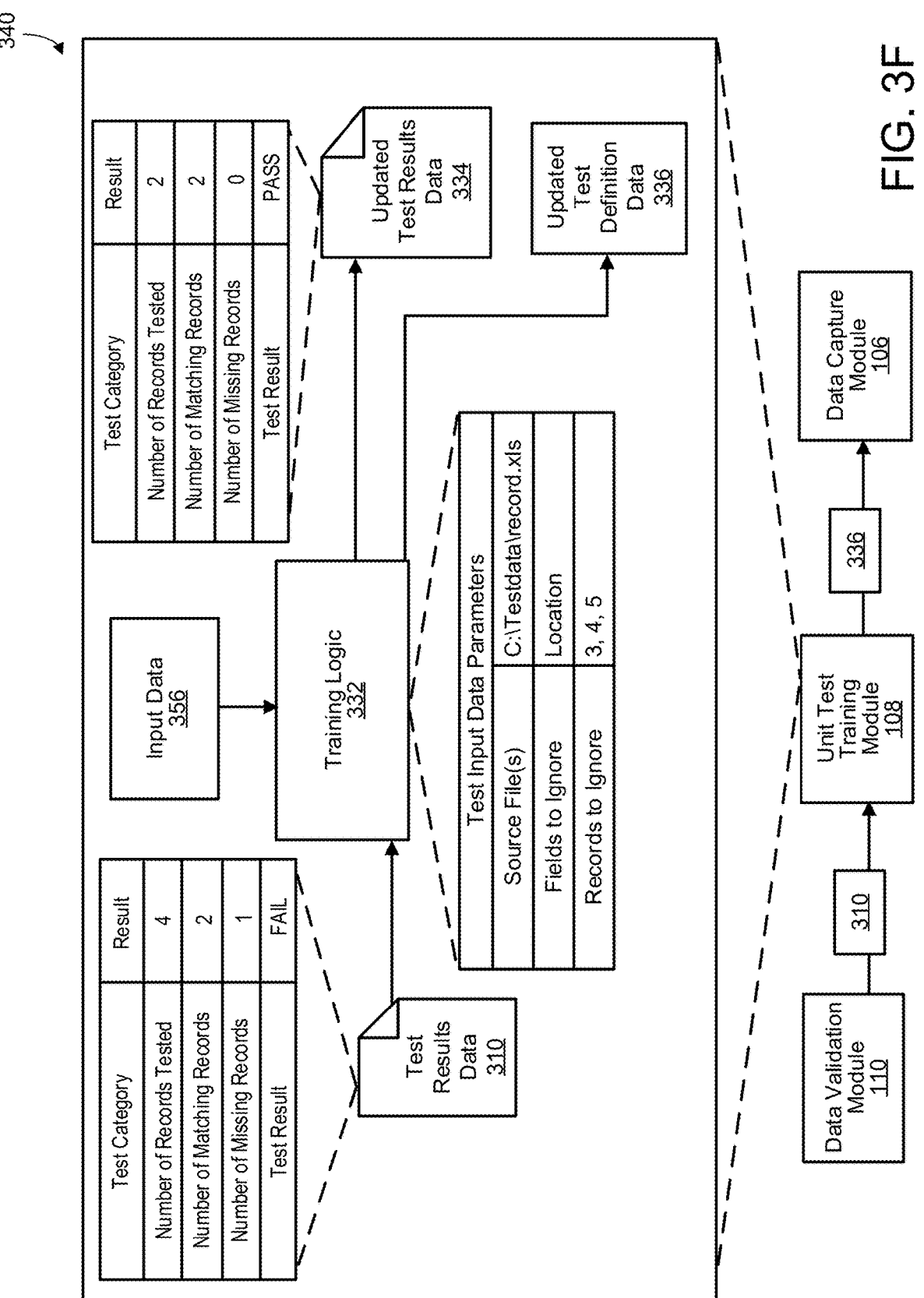

FIG. 3F shows an example process 340 for training the unit test using the unit test training module 108. The unit test training module 108 receives the test results 310 from the data validation module 110. The test results data 310 are input into the training logic 332 module, which can also receive user input data 356. The training logic 332 can specify what test output is considered a passed test based on the generated test output of a unit test. For example, the user can indicate that the generated output 304 actually should represent a passed test. The user can simply select an option that redefines the current generated output 304 as representing a passed test, and the unit test training module 108 automatically updates the expected output data 306 accordingly. In some implementations, the user can select particular fields to ignore for the test, adjust acceptable output ranges, etc. to update the unit test. The test results data 334 are updated to indicate that the current output represents a passed test (if applicable). The unit test training module 108 sends the update test definition data 336 to the data capture module 106, which can be accessed by the other modules during testing.

Figure 3G:
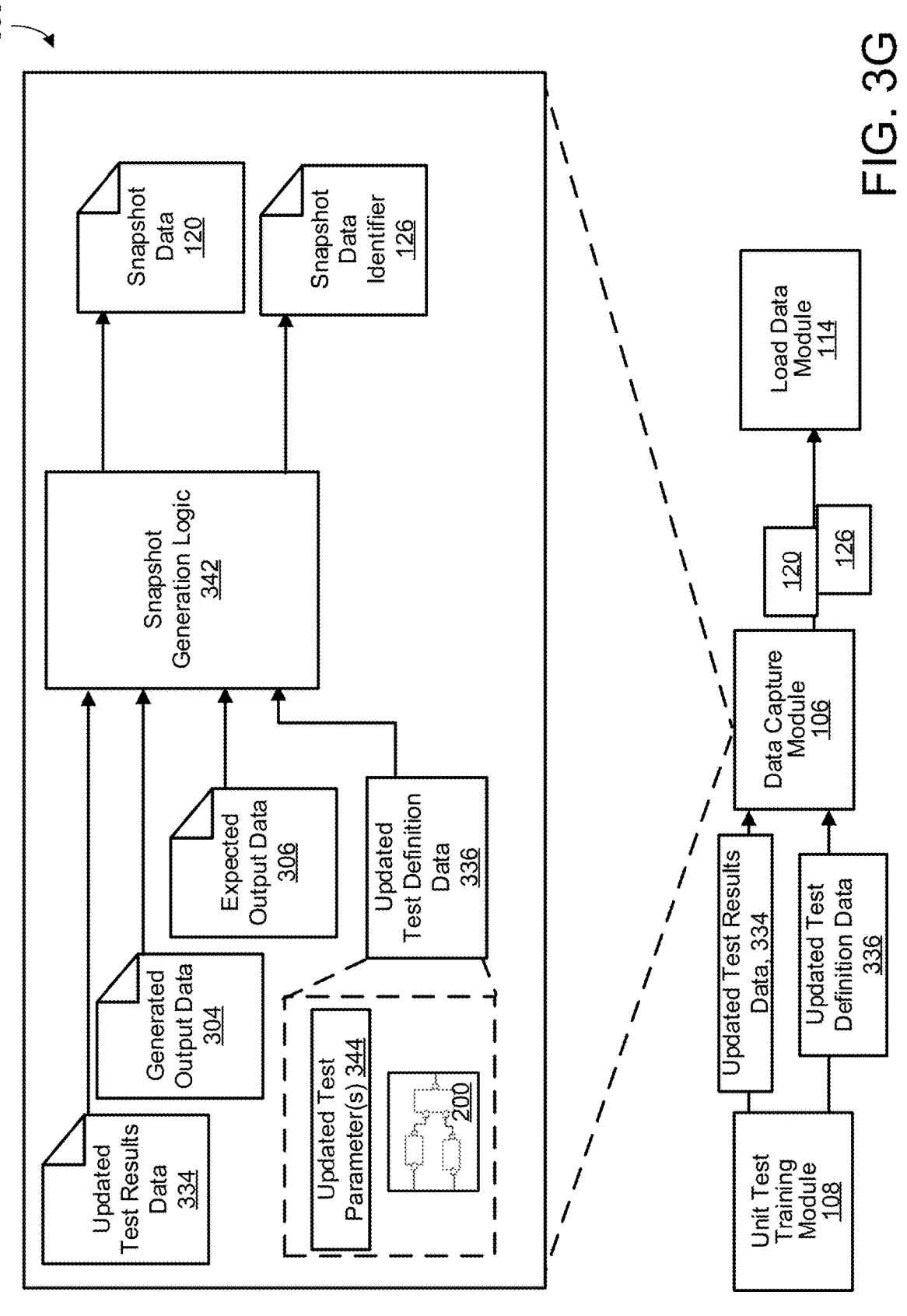

FIG. 3G shows a process 350 for data capture by the data capture module 106. The data capture module 106 receives the updated test results data 334 and the updated test definition data 336. These include the generated output data 304, the expected output data 306 (which may be updated by the unit test training module 108), the updated test parameters 344, and the dataflow graph 200. The data capture module includes snapshot generation logic 342 that generates the snapshot data 120 for storing in a repository as a version of the unit test. This process can include compressing all the data required for execution of the unit test into a compressed file or files, and sending the version to a repository. The snapshot generation logic 342 also generates a snapshot data identifier 126. The identifier 126 is stored in a version controlled repository, which can be sensitive to file sizes. The identifier 126 points to the associated snapshot data 120 representing the current version of the unit test. The identifier can include a hash value of the compressed snapshot 120 file(s). The snapshot data 120 and the identifier 126 are sent using a load data module 114 to associated databases.

Figure 3H:
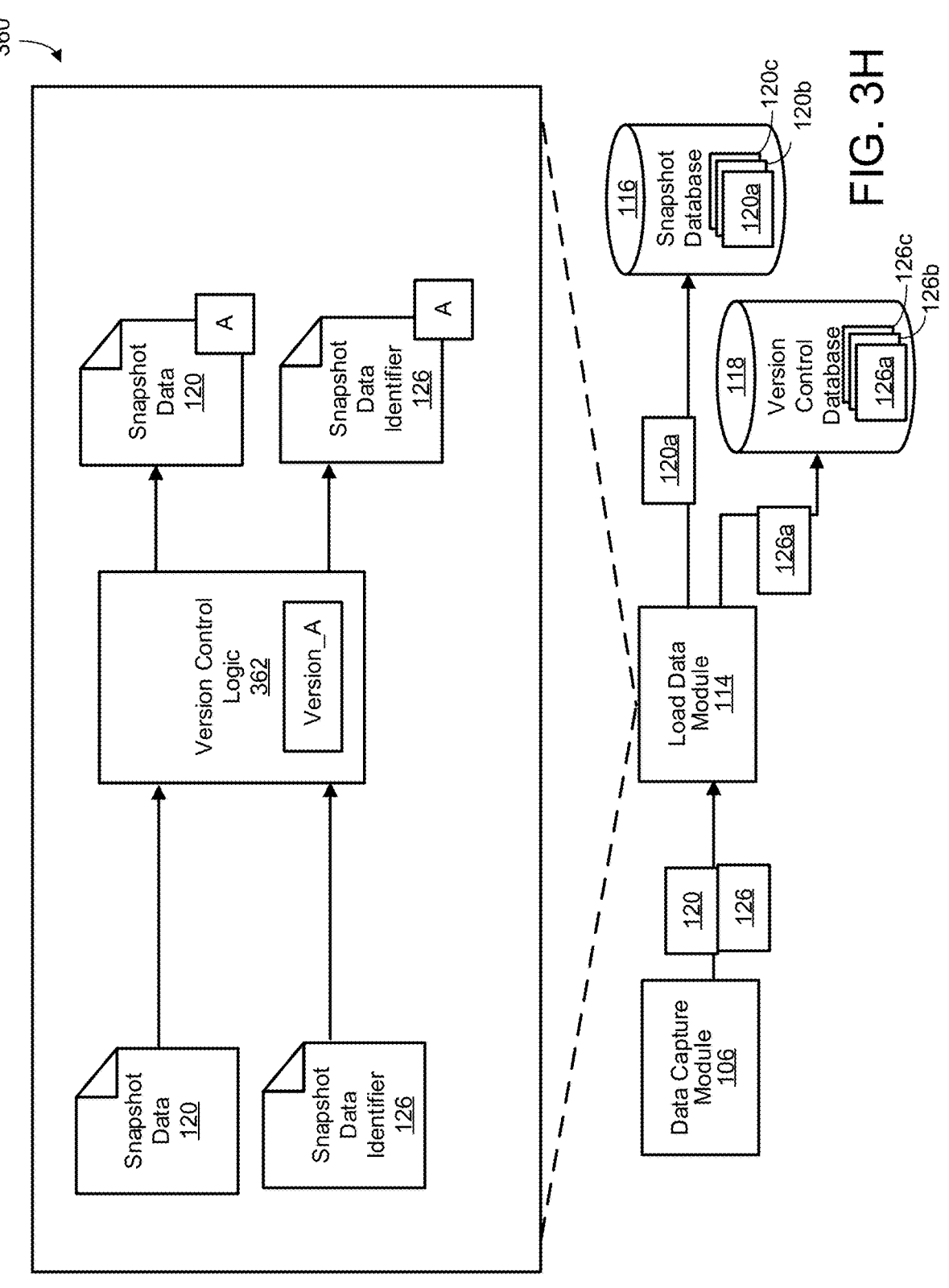

As shown in FIG. 3H, a process 360 for loading the snapshot data 120 and the identifier 126 is shown. The snapshot data 120 and the identifier 126 are received by the load data module 114. The load data module 114 includes version control logic 362 that associates each version of the snapshot data 120 with its identifier 126. The version 120a of the snapshot data and the corresponding identifier 126a are sent to the snapshot database 116 and the version control database 118, respectively. The snapshot database 116 can include multiple versions 120a, 120b, 120c, and so forth of the snapshot data 120, each representing a different version of the test. The version control database 118 includes the corresponding identifiers 126a, 126b, 126c, and so forth. These identifiers can be used to retrieve the desired version of the test. The version control database 118 can be a lightweight database, while the snapshot database 116 can be a larger database (e.g., a cloud-based database or data warehouse).

Turning to FIG. 4, an example of a user interface 400 is shown. The user interface 400 is configured to enable a user to edit test parameters in a test definitions window 402. The user interface 400 includes a test results window 404 for showing test results data of a unit test. The test definitions window 402 and the test results window 404 are shown side by side, but can also be presented separately from one another.

The test definitions window 402 shows a menu 406 for editing test parameters 124, such as graph parameters, probes, data source addresses, fields to ignore, test input data, and targets of the unit test. In an example, the menu 408 for probes is shown including probes A, B, and C.

The test results window 404 shows test results data. In window 404, the test results data includes a code coverage table 410. The code coverage table 410 includes data showing whether each expression of the testable logic 112 selected in the region 220 was executed during the unit test. Identifiers can be used to show whether the expression was executed for every record (FULL), for some of the records (PARTIAL), or that the expression was not executed (NOT EXECUTED). A number of the records for which the expression was executed can be shown.

The test results window 404 can show a probes table 412. The probes table 412 can show values that are recorded at the position of the probe in the dataflow graph. For example, values of the data flows for probes A, B, and C are shown for record 450. The table 412 can assist in the analysis of input data and output data of the dataflow graph for one or more records, as previously described.

A validation results table 414 can be included in the results data. As previously described in relation to FIGS. 3A-3H, the validation data shows whether the output data of the unit test match the expected output data, either by matching baseline data or by being validated with a validation function.

Figure 5:
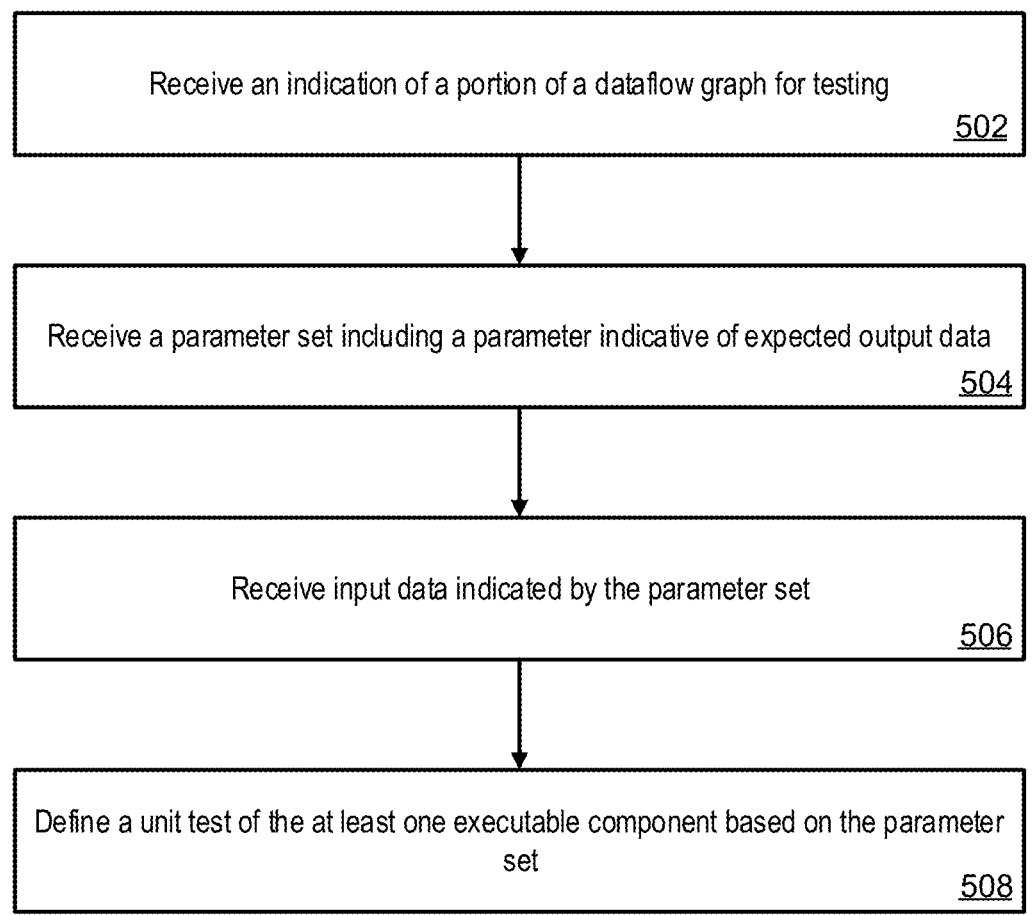
FIG. 5 shows a flow diagram.

Turning to FIG. 5, a flow diagram is shown including an example process 500 for configuring and execution of a unit test of at least a portion of a dataflow graph, such as by the system 102 of FIG. 1. The process 500 includes receiving (502) an indication of a portion of a dataflow graph for testing, the portion including at least one executable component of the dataflow graph. The data processing system 102 receives (504) a parameter set including a parameter indicative of expected output data to be generated by execution of the at least one executable component. The data processing system 102 receives (506) input data for the at least one executable component, the input data being indicated by the parameter set and configured for testing a functionality of the at least one executable component. The data processing system 102 defines (508) a unit test of the at least one executable component based on the parameter set. Generally the unit test is configured to provide the input data to one or more inputs of the dataflow graph, cause processing of the input data by the at least one executable component of the dataflow graph to generate output data, generate results data indicating a correspondence between the output data and the expected output data indicated by the parameter, and cause generation of structured data indicative of an association between the results data, the input data, and the dataflow graph (e.g., association of these data in a common file that can be linked to the version control database 118).

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the monitoring system 102, the client device 112, and the computing system 116 can be implemented using digital electronic circuitry, or in computer software, firmware, or hardware, or in combinations of one or more of them. In another example, the processes 500 and 600, can be implemented using digital electronic circuitry, or in computer software, firmware, or hardware, or in combinations of one or more of them.

Some implementations described in this specification (e.g., the test definition module 104 the data capture module 106, the unit test training module 108, the validation module 110, the load data module 114, etc.) can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. In some implementations, the query response module 104 and/or the data structure module 106 comprises a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 6:
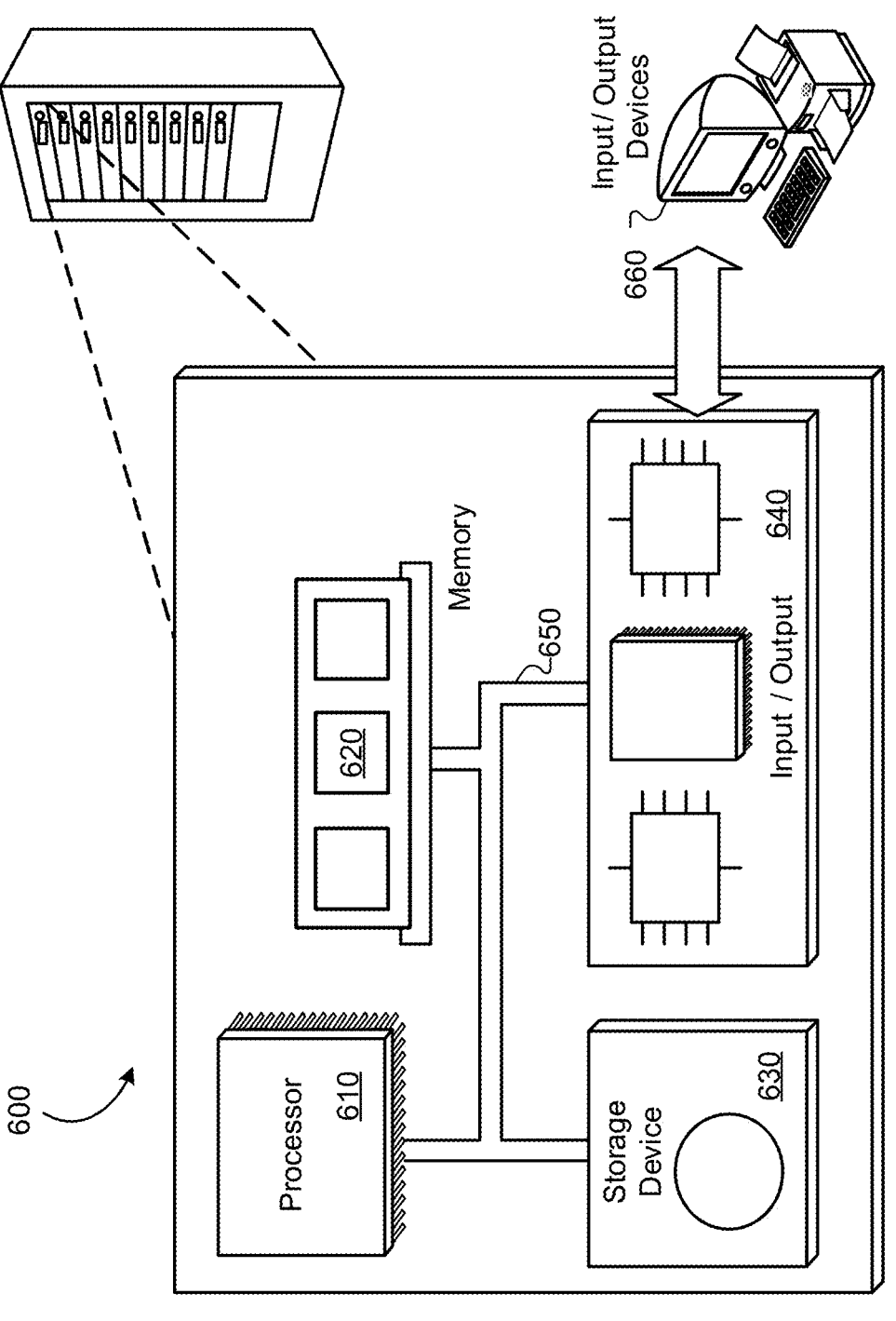
FIG. 6 is a diagram of an example computing system.

FIG. 6 shows an example computer system 600 that includes a processor 610, a memory 620, a storage device 630 and an input/output device 640. Each of the components 610, 620, 630 and 640 can be interconnected, for example, by a system bus 650. The processor 610 is capable of processing instructions for execution within the system 600. In some implementations, the processor 610 is a single-threaded processor, a multi-threaded processor, or another type of processor. The processor 610 is capable of processing instructions stored in the memory 620 or on the storage device 630. The memory 620 and the storage device 630 can store information within the system 600.

The input/output device 640 provides input/output operations for the system 600. In some implementations, the input/output device 640 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 660. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system described herein. Accordingly, other embodiments are within the scope of the following claims.

What is claimed is:

1. A method, implemented by a data processing system, for defining a unit test for a dataflow graph including a plurality of components, the method including:

accessing a dataflow graph including components and one or more dataflows representing flows of data records among the components, each of the components including executable logic including a set of instructions for processing the data records;

receiving an indication of a portion of the dataflow graph, the portion including a subset of the components for being tested separate from another portion of the dataflow graph including other components;

receiving parameters including:

an output parameter indicative of expected one or more output data records to be generated by execution of the executable logic of the subset of the components of the portion of the dataflow graph in response to receiving one or more input data records, and a source parameter that identifies:

a source of the one or more input data records, and one or more fields of the one or more input data records for being processed by the subset of the components during testing of the indicated portion of the dataflow graph, each of the one or more fields containing one or more values;

and defining a unit test for the subset of the components, the unit test being defined based on the parameters, the unit test being configured to test the portion of the dataflow graph separate from the other portion of the dataflow graph by causing operations including:

based on the source parameter that identifies the source of the one or more input data records, providing the one or more input data records to the indicated portion of the dataflow graph;

causing processing of data of the one or more fields of the one or more input data records to generate one or more output data records, the processing including executing the executable logic including the set of the instructions for the subset of the components of the portion of the dataflow graph;

based on the processing, generating results data indicating a correspondence between the generated one or more output data records and the expected one or more output data records indicated by the output parameter; and causing generation of structured data based on a combination of the results data, the one or more input data records, and the dataflow graph, wherein the structured data are stored in a data storage associated with a hash value for version control between a first version of the unit test defined by the parameter set and a second version of the unit test defined by a different parameter set of a different version of the structured data, the hash value for version control representing changes among prior versions of the structured data, subsequent versions of the structured data, or both relative to the structured data, for version control between the first version of the unit test from the second version of the unit test.

2. The method of claim 1, wherein the results data, the structured data, or both include data indicating whether the generated output data is in accordance with the expected output data.

3. The method of claim 1, the results data, the structured data, or both include data indicating that an error occurred based on the generated output data not being in accordance with the expected output data, data indicating at least one component at which the error occurred, and data providing guidance how to correct the error.

4. The method of claim 1, further including:
generating, or providing data for generating of, a graphical user interface that displays, or is configured to display, the data indicating that an error occurred based on the generated output data not being in accordance with the expected output data, the data indicating at least one component at which the error occurred, and the data providing guidance how to correct the error.

5. The method of claim 4, further including:
providing a control for receiving, by the graphical user interface, a modification of the input data, the expected output data, or functionality of the at least one component at which the error occurred;
providing the input data to the at least one component; and
causing processing, in accordance with the modification, of input data by the at least one component at which the error occurred to generate output data.

6. The method of claim 1, wherein the expected output data include baseline data, and wherein generating the results data includes comparing the generated output data to the baseline data.

7. The method of claim 1, wherein providing input data includes executing an application that generates the input data for feeding into the subset of the components.

8. The method of claim 1, wherein the expected output data include an expected result of a validation function, and wherein generating the results data includes applying the validation function to at least a portion of the generated output data to generate a result and comparing the result to the expected result according to applying the validation function to at least a portion of the expected output data.

9. The method of claim 8, wherein the validation function is configured to compare data from two different dataflows connected to one or more executable components including the subset of the components.

10. The method of claim 1, wherein the parameters includes at least one additional parameter indicating one of:
at least one position in the dataflow graph at which to extract the generated output data, a location of baseline data for comparing to the generated output data, a definition of a validation function for validation the generated output data.

11. The method of claim 1, further including:
receiving an indication of one or more portions of the input data to ignore during execution of a validation function; and
updating the parameters based on the received indication.

12. The method of claim 1, wherein the subset of the components is configured to receive source data from a source external to the dataflow graph during execution, and wherein the input data includes values corresponding to the source data from the source external to the dataflow graph and configured such that all operations of at least some of the operations of the subset of the components are invoked upon receipt of the values.

13. The method of claim 1, further including:
retrieving a portion of a lookup file that provides input values to the subset of the components for at least one function of the subset of the components, wherein the lookup file provided by a remote source; and
storing the portion of the lookup file in a data storage that is accessible by the subset of the components during execution of the subset of the components.

14. The method of claim 1, further including
determining that a data source for the subset of the components includes a function call;
for each function input of a set of function inputs of the function call, performing the function call to obtain a set of function outputs, each function output corresponding to a function input; and
storing the set of function outputs of the function call in a data storage that is accessible by the subset of the components during execution of the subset of the components.

15. The method of claim 1, further including:
traversing the dataflow graph to discover at least one dataflow of the dataflow graph; and
inserting a probe on the at least one dataflow to indicate a location in the dataflow graph for extracting additional results data from execution of at least one component of the at least one component.

16. The method of claim 1, wherein:
the hash value for the structured data represents a version of the structured data; and
wherein the hash value is stored in the data storage in association with a corresponding version of the dataflow graph.

17. The method of claim 1, further including generating, or providing data for generating of, a user interface that displays, or is configured to display, a representation of the dataflow graph, the user interface displaying or being for displaying, for the subset of the components of the subset of the components, an annotation indicative of an operational status of the subset of the components representing how the subset of the components executed during the unit test.

18. The method of claim 17, wherein the user interface includes an overlay layer showing one or more of the output data, the input data, and the results data associated with the dataflow graph in response to execution of the subset of the components of the dataflow graph.

19. The method of claim 1, further including generating, or providing data for generating of, a user interface that displays or is configured to display a representation of the dataflow graph, the user interface displaying or being for displaying a position in the representation of the dataflow graph in which the dataflow graph receives the input data.

20. The method of claim 1, wherein the results data include an indication that each function of the subset of the components:
generates output data matching baseline data,
generates output data that did not match the expected output data, or
does not generate output data.

21. The method of claim 1, wherein the unit test is further configured to cause operations including storing requested data that are requested by the subset of the components for processing the input data, wherein the requested data are included in the structured data.

22. The method of claim 1, wherein the structured data are linkable to prior versions of the structured data, subsequent versions of the structured data, or both.

23. The method of claim 1, wherein the dataflow graph is executable to process data records received by the dataflow graph.

24. The method of claim 1, wherein each component of the components include executable logic configurable to define an operation to be performed to process one or more values of the one or more fields of the data records received by the dataflow graph.

25. The method of claim 1, wherein the portion includes at least one component of the dataflow graph, in which the at least one component is connected to at least one dataflow for providing the data records to the at least one component that is included in the indicated portion of the dataflow graph.

26. A system implemented by data processing system for defining a unit test for a dataflow graph including a plurality of components, the system including:

a data storage storing instructions; and at least one processor configured to execute the instructions stored by the data storage to perform operations including:

accessing a dataflow graph including components and one or more dataflows representing flows of data records among the components, each of the components including executable logic including a set of instructions for processing the data records;

receiving an indication of a portion of the dataflow graph, the portion including a subset of the components for being tested separate from another portion of the dataflow graph including other components;

receiving parameters including:

an output parameter indicative of expected one or more output data records to be generated by execution of the executable logic of the subset of the components of the portion of the dataflow graph in response to receiving one or more input data records, and a source parameter that identifies:

a source of the one or more input data records, and one or more fields of the one or more input data records for being processed by the subset of the components during testing of the indicated portion of the dataflow graph, each of the one or more fields containing one or more values;

and defining a unit test for the subset of the components, the unit test being defined based on the parameters, the unit test being configured to test the portion of the dataflow graph separate from the other portion of the dataflow graph by causing operations including:

based on the source parameter that identifies the source of the one or more input data records, providing the one or more input data records to the indicated portion of the dataflow graph;

causing processing of data of the one or more fields of the one or more input data records to generate one or more output data records, the processing including executing the executable logic including the set of the instructions for the subset of the components of the portion of the dataflow graph;

based on the processing, generating results data indicating a correspondence between the generated one or more output data records and the expected one or more output data records indicated by the output parameter; and causing generation of structured data based on a combination of the results data, the one or more input data records, and the dataflow graph, wherein the structured data are stored in a data storage associated with a hash value for version control between a first version of the unit test defined by the parameter set and a second version of the unit test defined by a different parameter set of a different version of the structured data, the hash value for version control representing changes among prior versions of the structured data, subsequent versions of the structured data, or both relative to the structured data for version control between the first version of the unit test from the second version of the unit test.

27. The system of claim 26, wherein the results data, the structured data, or both include data indicate whether the generated output data is in accordance with the expected output data.

28. The system of claim 26, wherein the results data, the structured data, or both include data indicate that an error occurred based on the generated output data not being in accordance with the expected output data, data indicating at least one component at which the error occurred, and data providing guidance how to correct the error.

29. The system of claim 26, the operations further including:

generating, or providing data for generating of, a graphical user interface that displays, or is configured to display, the data indicating that an error occurred based on the generated output data not being in accordance with the expected output data, the data indicating at least one component at which the error occurred, and the data providing guidance how to correct the error.

30. The system of claim 29, the operations further including:

enabling receipt, by the graphical user interface, of a modification of the input data, the expected output data, or functionality of the subset of the components at which the error occurred;

providing the input data to the subset of the components; and causing processing, in accordance with the modification, of input data by the subset of the components at which the error occurred to generate output data.

31. One or more non-transitory computer readable media storing instructions for defining a unit test for a dataflow graph including a plurality of components, the instructions configured to cause at least one processor to perform operations including:

accessing a dataflow graph including components and one or more dataflows representing flows of data records among the components, each of the components including executable logic including a set of instructions for processing the data records;

receiving an indication of a portion of the dataflow graph, the portion including a subset of the components for being tested separate from another portion of the dataflow graph including other components;

receiving parameters including:

an output parameter indicative of expected one or more output data records to be generated by execution of the executable logic of the subset of the components of the portion of the dataflow graph in response to receiving one or more input data records, and a source parameter that identifies:

a source of the one or more input data records, and one or more fields of the one or more input data records for being processed by the subset of the components during testing of the indicated portion of the dataflow graph, each of the one or more fields containing one or more values; and defining a unit test for the subset of the components, the unit test being defined based on the parameters, the unit test being configured to test the portion of the dataflow graph separate from the other portion of the dataflow graph by causing operations including:

based on the source parameter that identifies the source of the one or more input data records, providing the one or more input data records to the indicated portion of the dataflow graph;

causing processing of data of the one or more fields of the one or more input data records to generate one or more output data records, the processing including executing the executable logic including the set of the instructions for the subset of the components of the portion of the dataflow graph;

based on the processing, generating results data indicating a correspondence between the generated one or more output data records and the expected one or more output data records indicated by the output parameter; and causing generation of structured data based on a combination of the results data, the one or more input data records, and the dataflow graph, wherein the structured data are stored in a data storage associated with a hash value for version control between a first version of the unit test defined by the parameter set and a second version of the unit test defined by a different parameter set of a different version of the structured data, the relationship hash value for version control representing changes among prior versions of the structured data, subsequent versions of the structured data, or both relative to the structured data for version control between the first version of the unit test from the second version of the unit test.

32. The one or more non-transitory computer readable media of claim 31, wherein the results data, the structured data, or both include data indicate whether the generated output data is in accordance with the expected output data.

33. The one or more non-transitory computer readable media of claim 31, wherein the results data, the structured data, or both include data indicate that an error occurred based on the generated output data not being in accordance with the expected output data, data indicating at least one component at which the error occurred, and data providing guidance how to correct the error.

34. The one or more non-transitory computer readable media of claim 31, the operations further including:

generating, or providing data for generating of, a graphical user interface that displays, or is configured to display, the data indicating that an error occurred based on the generated output data not being in accordance with the expected output data, the data indicating at least one component at which the error occurred, and the data providing guidance how to correct the error.

35. The one or more non-transitory computer readable media of claim 34, the operations further:

enabling receipt, by the graphical user interface, of a modification of the input data, the expected output data, or functionality of the subset of the components at which the error occurred;

providing the input data to the subset of the components; and causing processing, in accordance with the modification, of input data by the subset of the components at which the error occurred to generate output data.

\* \* \* \* \*